United States Patent
Hazen et al.

(10) Patent No.: US 10,356,204 B2
(45) Date of Patent: Jul. 16, 2019

(54) APPLICATION BASED HARDWARE IDENTIFIERS

(71) Applicant: Microsoft Technology Licensing, LLC, Redmond, WA (US)

(72) Inventors: John A. M. Hazen, Kirkland, WA (US); Stan D. Pennington, Newcastle, WA (US); Sermet Iskin, Issaquah, WA (US); Robin C. Speed, Winchester (GB); John M. Sheehan, Sammamish, WA (US); Scott B. Graham, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 13/714,389

(22) Filed: Dec. 13, 2012

(65) Prior Publication Data
US 2014/0173071 A1    Jun. 19, 2014

(51) Int. Cl.
*G06F 15/173* (2006.01)
*H04L 29/08* (2006.01)
(Continued)

(52) U.S. Cl.
CPC ........ *H04L 67/306* (2013.01); *H04L 63/0876* (2013.01); *H04L 63/12* (2013.01);
(Continued)

(58) Field of Classification Search
CPC ............. H04L 67/2819; H04L 67/2804; H04L 67/306; H04L 63/0876; H04L 63/12; H04L 61/2092; H04L 61/35; H04L 61/6004
(Continued)

(56) References Cited

U.S. PATENT DOCUMENTS

| 5,721,824 A | 2/1998 | Taylor |
| 5,974,549 A | 10/1999 | Golan |

(Continued)

FOREIGN PATENT DOCUMENTS

| CN | 1582430 | 2/2005 |
| CN | 1617101 | 5/2005 |

(Continued)

OTHER PUBLICATIONS

"CFUUID Reference", Retrieved from <https://developer.apple.com/library/mac/documentation/CoreFoundation/Reference/CFUUIDRef/CFUUIDRef.pdf>, (Jun. 11, 2012), 6 pages.
(Continued)

*Primary Examiner* — Kristie D Shingles

(57) ABSTRACT

An application based hardware identifier is generated for an application on a device. The application based hardware identifier is generated based on both information describing the application and information describing one or more hardware components of the device. The application based hardware identifier can also optionally be based on an identifier of a user of the device. The application based hardware identifier can be provided by the application to a service provider, allowing the service provider to associate the application based hardware identifier with a particular user or user account. However, as the application based hardware identifier is based on the application information, different applications on the same device will have different application based hardware identifiers. The application based hardware identifier thus helps maintain privacy by preventing tracking of the device across different applications.

20 Claims, 9 Drawing Sheets

(51) Int. Cl.
*H04L 29/06* (2006.01)
*H04L 29/12* (2006.01)

(52) U.S. Cl.
CPC .......... *H04L 61/2092* (2013.01); *H04L 61/35* (2013.01); *H04L 61/6004* (2013.01)

(58) Field of Classification Search
USPC ........................................................ 709/223
See application file for complete search history.

(56) References Cited

U.S. PATENT DOCUMENTS

| | | | |
|---|---|---|---|
| 6,052,120 A | 4/2000 | Nahi et al. | |
| 6,101,607 A | 8/2000 | Bachand et al. | |
| 6,117,187 A | 9/2000 | Staelin | |
| 6,151,643 A | 11/2000 | Cheng et al. | |
| 6,173,316 B1 | 1/2001 | De Boor et al. | |
| 6,279,111 B1 | 8/2001 | Jensenworth et al. | |
| 6,286,104 B1 | 9/2001 | Buhle et al. | |
| 6,308,173 B1 | 10/2001 | Glasser et al. | |
| 6,366,617 B1 | 4/2002 | Ryan | |
| 6,367,012 B1 | 4/2002 | Atkinson et al. | |
| 6,378,071 B1 | 4/2002 | Sasaki et al. | |
| 6,412,070 B1 | 6/2002 | Van Dyke et al. | |
| 6,522,694 B1 | 2/2003 | Ryan | |
| 6,604,209 B1 | 8/2003 | Grucci et al. | |
| 6,694,434 B1 | 2/2004 | McGee et al. | |
| 6,697,569 B1 | 2/2004 | Gomez et al. | |
| 6,725,452 B1 | 4/2004 | Te'eni et al. | |
| 6,865,659 B2 | 3/2005 | Montemayor | |
| 7,031,276 B2 | 4/2006 | Inoue | |
| 7,069,330 B1 | 6/2006 | McArdle et al. | |
| 7,095,855 B1* | 8/2006 | Collins | H04L 63/08 |
| | | | 380/241 |
| 7,151,832 B1 | 12/2006 | Fetkovich et al. | |
| 7,152,243 B2 | 12/2006 | Bourne et al. | |
| 7,337,442 B2 | 2/2008 | VoBa et al. | |
| 7,392,383 B2 | 6/2008 | Basibes et al. | |
| 7,398,532 B1 | 7/2008 | Barber et al. | |
| 7,401,235 B2 | 7/2008 | Mowers et al. | |
| 7,472,377 B2 | 12/2008 | Anand et al. | |
| 7,475,396 B2 | 1/2009 | Kapoor | |
| 7,478,094 B2 | 1/2009 | Ho et al. | |
| 7,512,810 B1 | 3/2009 | Ryan | |
| 7,542,988 B1 | 6/2009 | Cook et al. | |
| 7,607,131 B2 | 10/2009 | Oe et al. | |
| 7,650,501 B1 | 1/2010 | Brunette, Jr. et al. | |
| 7,650,627 B1 | 1/2010 | Stancheva et al. | |
| 7,664,924 B2 | 2/2010 | Safa | |
| 7,698,393 B2 | 4/2010 | Milstein et al. | |
| 7,716,734 B2 | 5/2010 | Birrell et al. | |
| 7,774,753 B1 | 8/2010 | Reilly et al. | |
| 7,779,265 B2 | 8/2010 | Dubhashi et al. | |
| 7,818,456 B2 | 10/2010 | Carro | |
| 7,870,387 B1 | 1/2011 | Bhargava et al. | |
| 7,882,251 B2* | 2/2011 | Banes | H04L 29/06 |
| | | | 370/392 |
| 7,925,875 B2 | 4/2011 | McAvoy | |
| 7,934,087 B2 | 4/2011 | Carter | |
| 8,001,528 B2 | 8/2011 | Bernabeu-Auban et al. | |
| 8,073,442 B2 | 12/2011 | Frank et al. | |
| 8,134,916 B2* | 3/2012 | Achlioptas | H04L 45/745 |
| | | | 370/216 |
| 8,185,889 B2 | 5/2012 | Kinder et al. | |
| 8,315,620 B1* | 11/2012 | Williamson | H04W 4/001 |
| | | | 455/418 |
| 8,327,441 B2* | 12/2012 | Kumar | G06F 21/57 |
| | | | 726/22 |
| 8,468,608 B1 | 6/2013 | Hernacki et al. | |
| 8,649,768 B1* | 2/2014 | Gaddam | H04W 12/06 |
| | | | 455/411 |
| 8,713,365 B2* | 4/2014 | Qureshi | G06F 11/1443 |
| | | | 709/227 |
| 8,838,982 B2* | 9/2014 | Carlson | H04L 63/12 |
| | | | 713/176 |
| 8,990,561 B2 | 3/2015 | Sheehan et al. | |
| 9,118,686 B2 | 8/2015 | Diaz-Cuellar et al. | |
| 9,679,130 B2 | 6/2017 | Sheehan et al. | |
| 9,800,688 B2 | 10/2017 | Pottier et al. | |
| 2001/0029605 A1 | 10/2001 | Forbes et al. | |
| 2002/0019941 A1 | 2/2002 | Chan et al. | |
| 2002/0071565 A1 | 6/2002 | Kurn et al. | |
| 2003/0009491 A1 | 1/2003 | Kanai | |
| 2003/0084134 A1 | 5/2003 | Pace et al. | |
| 2003/0229900 A1 | 12/2003 | Reisman | |
| 2004/0030926 A1 | 2/2004 | Clark | |
| 2004/0039924 A1 | 2/2004 | Baldwin et al. | |
| 2004/0148514 A1 | 7/2004 | Fee et al. | |
| 2004/0181557 A1 | 9/2004 | Orbits et al. | |
| 2004/0193606 A1 | 9/2004 | Arai et al. | |
| 2004/0199787 A1* | 10/2004 | Hans et al. | 713/200 |
| 2005/0055315 A1 | 3/2005 | Darweesh et al. | |
| 2005/0071641 A1 | 3/2005 | Basibes et al. | |
| 2005/0091535 A1 | 4/2005 | Kavalam et al. | |
| 2005/0091655 A1 | 4/2005 | Probert et al. | |
| 2005/0091658 A1 | 4/2005 | Kavalam et al. | |
| 2005/0132350 A1 | 6/2005 | Markley et al. | |
| 2005/0154738 A1 | 7/2005 | Thomas et al. | |
| 2005/0246762 A1 | 11/2005 | Girouard et al. | |
| 2005/0256859 A1 | 11/2005 | Keohane et al. | |
| 2005/0273841 A1 | 12/2005 | Freund | |
| 2005/0289348 A1 | 12/2005 | Joy et al. | |
| 2006/0048129 A1 | 3/2006 | Napier et al. | |
| 2006/0080546 A1 | 4/2006 | Brannon et al. | |
| 2006/0090192 A1 | 4/2006 | Corby et al. | |
| 2006/0155986 A1 | 7/2006 | Kleinhuis et al. | |
| 2006/0174252 A1 | 8/2006 | Besbris et al. | |
| 2006/0174334 A1 | 8/2006 | Perlin et al. | |
| 2006/0193467 A1 | 8/2006 | Levin | |
| 2006/0253909 A1 | 11/2006 | Cherepov | |
| 2006/0259606 A1 | 11/2006 | Rogers et al. | |
| 2006/0259980 A1 | 11/2006 | Field et al. | |
| 2007/0005734 A1 | 1/2007 | Abdo | |
| 2007/0027872 A1 | 2/2007 | Johnson et al. | |
| 2007/0083655 A1 | 4/2007 | Pedersen | |
| 2007/0146777 A1 | 6/2007 | Cranitch et al. | |
| 2007/0157287 A1 | 7/2007 | Lim | |
| 2007/0157302 A1 | 7/2007 | Ottamalika et al. | |
| 2007/0192500 A1 | 8/2007 | Lum | |
| 2007/0208857 A1 | 9/2007 | Danner et al. | |
| 2007/0226790 A1 | 9/2007 | Maher et al. | |
| 2007/0234412 A1 | 10/2007 | Smith et al. | |
| 2007/0239981 A1 | 10/2007 | Lessing | |
| 2007/0240194 A1 | 10/2007 | Hargrave et al. | |
| 2008/0047000 A1* | 2/2008 | Kanamaru et al. | 726/17 |
| 2008/0066148 A1* | 3/2008 | Lim | 726/1 |
| 2008/0074707 A1 | 3/2008 | Cranitch et al. | |
| 2008/0092133 A1 | 4/2008 | Mantere | |
| 2008/0120707 A1 | 5/2008 | Ramia | |
| 2008/0162698 A1 | 7/2008 | Hopen et al. | |
| 2008/0201705 A1 | 8/2008 | Wookey | |
| 2008/0220878 A1 | 9/2008 | Oliver | |
| 2008/0244723 A1 | 10/2008 | Brewster et al. | |
| 2008/0282354 A1 | 11/2008 | Wobber et al. | |
| 2008/0307491 A1 | 12/2008 | Duri et al. | |
| 2009/0022325 A1 | 1/2009 | Naedele | |
| 2009/0064003 A1 | 3/2009 | Harris et al. | |
| 2009/0100421 A1 | 4/2009 | Flaming et al. | |
| 2009/0113528 A1 | 4/2009 | Ananda et al. | |
| 2009/0144659 A1 | 6/2009 | Do | |
| 2009/0170431 A1 | 7/2009 | Pering et al. | |
| 2009/0187772 A1* | 7/2009 | Lange | G06F 21/10 |
| | | | 713/193 |
| 2009/0193507 A1 | 7/2009 | Ibrahim | |
| 2009/0222659 A1 | 9/2009 | Miyabayashi | |
| 2009/0222894 A1 | 9/2009 | Kenny et al. | |
| 2009/0249283 A1 | 10/2009 | Bourdon | |
| 2009/0249436 A1 | 10/2009 | Coles et al. | |
| 2009/0307360 A1 | 12/2009 | Ianchici et al. | |
| 2009/0307684 A1 | 12/2009 | Best et al. | |
| 2009/0312093 A1* | 12/2009 | Walker | G07F 17/32 |
| | | | 463/25 |

(56) References Cited

U.S. PATENT DOCUMENTS

| | | |
|---|---|---|
| 2009/0319673 A1 | 12/2009 | Peters |
| 2009/0327900 A1 | 12/2009 | Noll et al. |
| 2009/0328180 A1 | 12/2009 | Coles et al. |
| 2010/0037216 A1 | 2/2010 | Carcerano et al. |
| 2010/0058320 A1 | 3/2010 | Milligan et al. |
| 2010/0081375 A1 | 4/2010 | Rosenblatt |
| 2010/0100929 A1 | 4/2010 | Bae et al. |
| 2010/0107215 A1 | 4/2010 | Bechtel et al. |
| 2010/0153671 A1 | 6/2010 | Safa |
| 2010/0174599 A1 | 7/2010 | Rosenblatt |
| 2010/0192147 A1 | 7/2010 | Kadota |
| 2010/0192211 A1 | 7/2010 | Bono et al. |
| 2010/0201489 A1* | 8/2010 | Griffin ............... G06F 21/6245 340/10.1 |
| 2010/0211793 A1* | 8/2010 | Park ..................... H04N 7/162 713/176 |
| 2010/0221999 A1 | 9/2010 | Braun et al. |
| 2010/0229165 A1 | 9/2010 | Normington et al. |
| 2010/0229242 A1 | 9/2010 | Iga |
| 2010/0257569 A1 | 10/2010 | O'Hanlon |
| 2010/0278345 A1 | 11/2010 | Alsina et al. |
| 2010/0287513 A1 | 11/2010 | Singh et al. |
| 2010/0287547 A1 | 11/2010 | Korkishko et al. |
| 2010/0293383 A1 | 11/2010 | Coughlin et al. |
| 2010/0318997 A1 | 12/2010 | Li et al. |
| 2011/0066851 A1 | 3/2011 | Bello et al. |
| 2011/0070827 A1 | 3/2011 | Griffin et al. |
| 2011/0070837 A1* | 3/2011 | Griffin ............... H04B 5/0062 455/41.3 |
| 2011/0098030 A1 | 4/2011 | Luoma |
| 2011/0125799 A1 | 5/2011 | Kandasamy et al. |
| 2011/0202905 A1* | 8/2011 | Mahajan ................ G06F 8/43 717/140 |
| 2011/0210983 A1 | 9/2011 | Theimer et al. |
| 2011/0231836 A1 | 9/2011 | Wookey |
| 2011/0252417 A1 | 10/2011 | Cui et al. |
| 2012/0005674 A1 | 1/2012 | Larimore et al. |
| 2012/0066757 A1 | 3/2012 | Vysogorets et al. |
| 2012/0194534 A1 | 8/2012 | Benno et al. |
| 2012/0240236 A1* | 9/2012 | Wyatt et al. ..................... 726/25 |
| 2012/0280837 A1 | 11/2012 | Clements |
| 2012/0297288 A1 | 11/2012 | Mansouri |
| 2012/0303818 A1 | 11/2012 | Thibeault et al. |
| 2013/0019233 A1 | 1/2013 | Pardehpoosh et al. |
| 2013/0024929 A1 | 1/2013 | Abraham et al. |
| 2013/0054734 A1 | 2/2013 | Bond et al. |
| 2013/0061273 A1 | 3/2013 | Reisman |
| 2013/0061309 A1 | 3/2013 | Diaz-Cuellar et al. |
| 2013/0061316 A1 | 3/2013 | Iskin et al. |
| 2013/0062401 A1* | 3/2013 | Sheehan et al. .............. 235/375 |
| 2013/0065526 A1 | 3/2013 | Pottier et al. |
| 2013/0067459 A1 | 3/2013 | Sannidhanam et al. |
| 2013/0067600 A1 | 3/2013 | Graham et al. |
| 2013/0078948 A1* | 3/2013 | Pecen ................ H04L 63/0823 455/411 |
| 2013/0078949 A1* | 3/2013 | Pecen .................. H04L 63/101 455/411 |
| 2013/0263262 A1 | 10/2013 | Forristal |
| 2013/0283377 A1* | 10/2013 | Das et al. ....................... 726/23 |
| 2014/0344667 A1 | 11/2014 | Risney, Jr. et al. |
| 2015/0135206 A1 | 5/2015 | Reisman |
| 2015/0135214 A1 | 5/2015 | Reisman |
| 2015/0178495 A1 | 6/2015 | Sheehan et al. |

FOREIGN PATENT DOCUMENTS

| | | |
|---|---|---|
| CN | 1633084 | 6/2005 |
| CN | 1959631 | 5/2007 |
| CN | 101017447 | 8/2007 |
| CN | 101131725 | 2/2008 |
| CN | 101616719 | 12/2009 |
| CN | 101622624 | 1/2010 |
| CN | 101925913 | 12/2010 |
| CN | 102129364 | 7/2011 |
| CN | 102938939 | 2/2013 |
| EP | 2086206 | 8/2009 |
| JP | 2002517854 | 6/2002 |
| JP | 2004192601 | 7/2004 |
| JP | 2005129066 | 5/2005 |
| JP | 2005528051 | 9/2005 |
| JP | 2010176690 | 8/2010 |
| JP | 2011002962 | 1/2011 |
| JP | 2013041370 | 2/2013 |
| WO | WO-0205184 | 1/2002 |
| WO | WO 2002005184 | 1/2002 |
| WO | WO-03100581 | 12/2003 |
| WO | WO-2009047473 | 4/2009 |
| WO | WO-2010002497 | 1/2010 |
| WO | WO-2013036472 | 3/2013 |
| WO | WO-2013039528 | 3/2013 |

OTHER PUBLICATIONS

"Dependency Resolution Rules", retrieved from http://nuget.codeplex.com/wikipage?title=Dependency%20Resolution on Jul. 15, 2011, 3 pages.

"Non-Final Office Action", U.S. Appl. No. 13/228,695, (dated Feb. 12, 2013), 9 pages.

"SecureUDID", Retrieved from <http://www.secureudid.org/> on Dec. 11, 2012, 3 pages.

"Security for Runtime Resources: Access Control Lists", retrieved from <http://publib.boulder.ibm.com/infocenter/wmbhelp/v6r1m0/index.jsp?topic=/com.ibm.etools.mft.doc/ap01380_.htm> on Jul. 27, 2011, 3 pages.

"Structural Analysis", retrieved from http://www.headwaysoftware.com/products/structure101/structrual-analysis.php#deep-structural-analysis-section on Jul. 15, 2011, 10 pages.

Begemann, Ole "UDID Replacement APIs in iOS 6", Retrieved from <http://oleb.net/blog/2012/09/udid-apis-in-ios-6/>_on_12/11/2012, (Sep. 20, 2012), 4 pages.

Burrows, Daniel "Modelling and Resolving Software Dependencies", retrieved from http://people.debian.org/~dburrows/model.pdf, (Jun. 15, 2005), pp. 1-16.

Eno, et al., "How to find serial number of Android device?", Retrieved from <http://stackoverflow.com/questions/2322234/how-to-find-serial-number-of-android-device>, (Feb. 23, 2012), 6 pages.

Galindo, Jose A., et al., "Debian Packages Repositories as Software Product Line Models. Towards Automated Analysis", retrieved from http://www.isi.us.es/~segura/files/papers/galindo10-acosta.pdf; *Proceedings of the First International Workshop on Automated Configuration and Tailoring of Applications*, (2010), 6 pages.

Kitz, Georg "Gekitz" "UIDevice with UniqueIdentifier for iOS 5", Retrieved from <https://github.com/gekitz/UIDevice-with-Uniqueldentifier-for-iOS-5> on Dec. 11, 2012, 5 pages.

Lange, Thomas "FAI Guide (Fully Automatic Installation)", retrieved from http://debian.uni-duisburg-essen.de/misc/FAI/fai-guide_2.5.3.pdf, (Dec. 5, 2005), 70 pages.

Manzoor, Umar et al., "Silent Unattended Installation Package Manager—SUIPM", retrieved from http://ieeexplore.ieee.org/stamp/stamp.jsp?tp=&arnumber=5172599; *International Conference on Computational Intelligence for Modelling Control & Automation*, (Dec. 10-12, 2008), pp. 55-60.

"Access Control Lists in Linux", Retrived at <<http://users.suse.com/~agruen/acl/chapter/fs_acl-en.pdf>>, (Jul. 18, 2003), 13 pages.

"Android Devlopers Security and Permissions", Retrieved from: <http://devloper.android.com/guide/topics/security/security.html> on Jul. 18, 2011, (Jul. 18, 2011), 5 pages.

"ClickOnce Security and Deployment", Retrieved at <<http://msdn.microsoft.com/en-us/library/t71a733d%28d=printer%29.aspx>> on Mar. 15, 2013, 4 pages.

"Final Office Action", U.S. Appl. No. 13/228,695, (dated May 31, 2013), 14 pages.

"LoKast shares media between iPhones and Android phones", retrieved from <<http://venturebeat._com/2010/07/21/lokast-shares-media-between-iphones-and-android-phones/>>, (Jul. 21, 2010), 3 pages.

(56) References Cited

OTHER PUBLICATIONS

"Network Policy Settings Properties", Retrieved from: <http://technet.microsoft.com/en-us/library/cc772474%28WS.10%29.aspx> on Jul. 25, 2011, 1 page.

"Securing the Process Control Network", *Enterasys Secure Networks*, Available at <http://www.enterasys.com/company/literature/threat-mgmt-process-control-wp.pdf>,(Apr. 2009), 6 pages.

"User Accounts & Admin Privelages", Retrieved at <http://www.techno-kitten.com/Changes_to_PowerBuilder/9_New_in_Power. .. B111_New_-_User_Accounts_and_Aipb111_new_-_user_accounts_and_a.html>, Retrieved Date: Jul. 29, 2011,, 2 pages.

Abadi, Martin et al., "Access Control in a World of Software Diversity", *HTOS '05*, available at <http://research.microsoft.com/pubs/54665/accesscontrolwithdiversity.pdf>,(Jun. 2005), 6 pages.

Engelsma, Jonathan R., et al., "EncounterEngine: Integrating Bluetooth User Proximity Data into Social Applications", *IEEE International Conference on Wireless & Mobile Computing, Networking & Communication*, (2008), pp. 502-507.

Esbensen, Morten et al., "Pour Images—An Interactive System for Sharing Images", (2010), 9 pages.

Kortuem, Gerd et al., "Sensing and Visualizing Spatial Relations of Mobile Device", *UIST '05 Proceedings of the 18th Annual ACM Symposium on User Interface Software and Technology,*, (Oct. 2005),10 pages.

Rekimoto, Jun et al., "Proximal Interactions: A Direct Manipulation Technique for Wireless Networking", (Aug. 2003), 8 pages.

Rodriguez, Jamie "Windows Phone Capabilities Security Model", Retrieved from: <http://blogs.msdn.com/b/jaimer/archive/2010/04/30/windows-phone-capabilities-security-model.aspx> on Jul. 18, 2011,(Apr. 30, 2010), 3 pages.

Xing, Bo et al., "Proximeter: Enabling Mobile Proximity-Based Content Sharing on Portable Devices", *IEEE International Conference on Pervasive Computing and Communications, PerCom 2009*, (Mar. 2009), 3 pages.

Egele, et al., "PiOS: Detecting Privacy Leaks in iOS Applications", Retrived at <<https://www.seclab.tuwien.ac.at/papers/egele-ndss11.pdf>> Proceedings in 18th Annual Network and Distributed System Security Symposium, Feb. 2011, pp. 15.

Smith, Eric., "iPhone Applications & Privacy Issues: An Analysis of Application Transmission of iPhone", Retrieved at <<http://www.kompatscher.biz/phocadownload/iPhone-Applications-Privacy-Issues.pdf»>, Oct. 1, 2010, pp. 19.

Beede, et al., "MyShield: Protecting Mobile Device Data via Security Circles", Retrieved at <<https://www.cs.colorado.edu/department/publications/reports/docs/CU-CS-1091-12.pdf>>, Proceedings of the Technical Report CU-CS-1091-12, Jul. 9, 2012, pp. 14.

"Authorization API", Retrieved at <<http://developers.cloudmade.com/projects/show/auth>>, Retrieved Date: Jul. 9, 2012, pp. 3.

"Amid Privacy Concerns, Apple Has Started Rejecting Apps That Access UDIDs", Retrieved at <<http://techcrunch.com/2012/03/24/apple-udids/>>, Mar. 24, 2012, p. 1.

"Identifying App Installations", Retrieved at <<http://android-developers.blogspotin/2011/03/identifying-app-installations.html>>, pp. 2.

"Final Office Action", U.S. Appl. No. 13/228,695, dated Sep. 22, 2014, 12 pages.

"Foreign Office Action", CN Application No. 201210335798.6, dated Sep. 23, 2014, 13 pages.

"Non-Final Office Action", U.S. Appl. No. 13/229,446, dated Oct. 23, 2014, 17 pages.

"Non-Final Office Action", U.S. Appl. No. 13/230,640, dated Oct. 21, 2014, 15 pages.

"Notice of Allowance", U.S. Appl. No. 13/228,695, dated Nov. 10, 2014, 8 pages.

"Class StreamSource", Retrieved from <http://docs.oracle.com/javase/6/docs/api/javax/xml/transform/stream/StreamSource.html> on Mar. 12, 2013, 2011, 6 pages.

"Customizing the Content, Look and Feel of XML Data", Retrieved from <https://docs.tibco.com/pub/hawk/4.9.0_november_2010/html/tib_hawk_http_adapter_user_guide/wwhelp/wwhimpl/common/html/wwhelp.htm#context=tib_hawk_http_adapter_user_guide&file=httpAdap.3.05.htm> on Mar. 12, 2013, Nov. 9, 2010, 3 pages.

"Final Office Action", U.S. Appl. No. 13/229,446, dated Apr. 9, 2014, 19 pages.

"Loading HTML Content from a Stream", Retrieved from <http://msdn.microsoft.com/en-us/library/aa752047(v=vs.85).aspx> on Mar. 12, 2013, Apr. 10, 2010, 5 pages.

"Non-Final Office Action", U.S. Appl. No. 13/228,695, dated Apr. 30, 2014, 9 pages.

"Non-Final Office Action", U.S. Appl. No. 13/229,446, dated Oct. 22, 2013, 16 pages.

Abadi, et al., "A Logical Account of NGSCB", Retrieved from <http://research.microsoft.com/apps/pubs/default.aspx?id=54445>Apr. 19, 2014, Sep. 2004, 13 pages.

Steinberg, et al., "A Web Middleware Architecture for Dynamic Customization of Web Content for Wireless Clients", Proceedings of the 11th International Conference on World Wide Web, Available at <http://www2002.org/CDROM/refereed/483/>,May 7, 2002, 21 pages.

"Final Office Action", U.S. Appl. No. 13/225,945, dated Apr. 16, 2015, 20 pages.

"Final Office Action", U.S. Appl. No. 13/225,945, dated Jun. 24, 2013, 20 pages.

"Final Office Action", U.S. Appl. No. 13/225,945, dated Sep. 22, 2014, 25 pages.

"Final Office Action", U.S. Appl. No. 13/230,640, dated Mar. 25, 2015, 18 pages.

"International Search Report and Written Opinion", Application No. PCT/US2012/053623, dated Dec. 10, 2012, 9 pages.

"Non-Final Office Action", U.S. Appl. No. 13/225,945, dated Jan. 14, 2015, 24 pages.

"Non-Final Office Action", U.S. Appl. No. 13/225,945, dated Mar. 18, 2013, 16 pages.

"Non-Final Office Action", U.S. Appl. No. 13/225,945, dated May 30, 2014, 22 pages.

"Extended European Search Report", EP Application No. 11872418.6, dated Apr. 29, 2015, 7 pages.

"Final Office Action", U.S. Appl. No. 13/229,446, dated Jun. 19, 2015, 18 pages.

"Foreign Office Action", CN Application No. 201210335798.6, dated May 5, 2015, 15 pages.

"Final Office Action", U.S. Appl. No. 13/226,223, dated Aug. 23, 2013, 18 pages.

"Final Office Action", U.S. Appl. No. 13/226,223, dated Sep. 19, 2014, 22 pages.

"Final Office Action", U.S. Appl. No. 13/229,367, dated Jun. 2, 2015, 19 pages.

"Final Office Action", U.S. Appl. No. 13/229,367, dated Jul. 26, 2013, 17 pages.

"Final Office Action", U.S. Appl. No. 13/229,367, dated Aug. 29, 2014, 17 pages.

"Final Office Action", U.S. Appl. No. 13/898,432, dated Jan. 15, 2016, 22 pages.

"Foreign Office Action", CN Application No. 201210326881.7, dated May 19, 2015, 13 pages.

"Foreign Office Action", CN Application No. 201210331181.7, dated Sep. 1, 2015, 11 pages.

"Foreign Office Action", JP Application No. 2014-529674, dated Sep. 29, 2015, 8 pages.

"Foreign Office Action", JP Application No. 2014-529686, dated Aug. 25, 2015, 8 pages.

"International Search Report and Written Opinion", Application No. PCT/US2011/055741, dated Sep. 12, 2012, 9 pages.

"Non-Final Office Action", U.S. Appl. No. 13/226,223, dated Apr. 17, 2013, 15 pages.

"Non-Final Office Action", U.S. Appl. No. 13/226,223, dated May 30, 2014, 24 pages.

"Non-Final Office Action", U.S. Appl. No. 13/226,223, dated Nov. 14, 2014, 29 pages.

(56) References Cited

OTHER PUBLICATIONS

"Non-Final Office Action", U.S. Appl. No. 13/229,367, dated Jan. 30, 2015, 18 pages.
"Non-Final Office Action", U.S. Appl. No. 13/229,367, dated Mar. 21, 2013, 16 pages.
"Non-Final Office Action", U.S. Appl. No. 13/229,367, dated Mar. 31, 2014, 16 pages.
"Non-Final Office Action", U.S. Appl. No. 13/229,367, dated Oct. 8, 2015, 31 pages.
"Non-Final Office Action", U.S. Appl. No. 13/229,446, dated Nov. 13, 2015, 19 pages.
"Non-Final Office Action", U.S. Appl. No. 14/639,615, dated Oct. 21, 2015, 5 pages.
"Notice of Allowance", U.S. Appl. No. 13/226,223, dated Apr. 8, 2015, 12 pages.
"Extended European Search Report", EP Application No. 11872101.8, dated Apr. 9, 2015, 6 pages.
"Extended European Search Report", EP Application No. 12830755.0, dated Mar. 24, 2015, 6 pages.
"Foreign Office Action", CN Application No. 201210326881.7, dated Sep. 3, 2014, 13 pages.
"Foreign Office Action", CN Application No. 201210331181.7, dated Oct. 8, 2014, 11 pages.
"Manifest Permission", Android Developers, Apr. 28, 2011, 18 pages.
"Non-Final Office Action", U.S. Appl. No. 13/230,640, dated Jul. 23, 2015, 19 Pages.
"Non-Final Office Action", U.S. Appl. No. 13/898,432, dated Jul. 17, 2015, 17 pages.
Smith,"iPhone Applications and Privacy Issues: An Analysis of Application Transmission of iPhone Unique Device Identifiers (UDIDs)", iPhone Applications and Privacy Issues, Oct. 1, 2010, 19 pages.
"Foreign Office Action", JP Application No. 2014-529794, dated Aug. 9, 2016, 6 pages.
"Notice of Allowance", U.S. Appl. No. 14/639,615, dated Sep. 28, 2016, 8 pages.
"Final Office Action", U.S. Appl. No. 13/229,367, dated Mar. 11, 2016, 33 pages.
"Final Office Action", U.S. Appl. No. 13/229,446, dated Jun. 2, 2016, 21 pages.
"Final Office Action", U.S. Appl. No. 13/230,640, dated Apr. 14, 2016, 18 pages.
"Foreign Notice of Allowance", CN Application No. 201210326881.7, dated Mar. 3, 2016, 4 pages.
"Foreign Notice of Allowance", CN Application No. 201210331181.7, dated Dec. 2, 2015, 4 pages.
"Foreign Office Action", CN Application No. 201210326881.7, dated Dec. 24, 2015, 8 pages.
"Foreign Office Action", CN Application No. 201210335798.6, dated Dec. 28, 2015, 6 pages.
"Foreign Office Action", JP Application No. 2014-529686, dated Apr. 26, 2016, 9 pages.
"International Search Report and Written Opinion", Application No. PCT/US2011/055538, dated Sep. 3, 2012, 8 pages.
"Notice of Allowance", U.S. Appl. No. 14/639,615, dated Apr. 5, 2016, 8 pages.
"Notice of Allowance", U.S. Appl. No. 14/639,615, dated Jul. 13, 2016, 8 pages.
"Non-Final Office Action", U.S. Appl. No. 13/230,640, dated Aug. 29, 2016, 21 pages.
"Non-Final Office Action", U.S. Appl. No. 13/898,432, dated Jul. 28, 2016, 22 pages.
"Foreign Office Action", CN Application No. 201210335798.6, dated Jun. 12, 2016, 7 pages.
"Foreign Office Action", JP Application No. 2014-529674, dated Jun. 7, 2016, 8 pages.
"Notice of Allowance", U.S. Appl. No. 13/229,367, dated Jun. 29, 2017, 12 pages.
"Notice of Allowance", U.S. Appl. No. 13/898,432, dated Aug. 21, 2017, 8 pages.
"Advisory Action", U.S. Appl. No. 13/230,640, dated May 12, 2017, 3 pages.
"Final Office Action", U.S. Appl. No. 13/230,640, dated Mar. 20, 2017, 20 pages.
"Final Office Action", U.S. Appl. No. 13/898,432, dated Dec. 29, 2016, 23 pages.
"Non-Final Office Action", U.S. Appl. No. 14/639,615, dated Dec. 9, 2016, 10 pages.
"Notice of Allowance", U.S. Appl. No. 13/230,640, dated Jun. 12, 2017, 7 pages.
"Notice of Allowance", U.S. Appl. No. 14/639,615, dated Mar. 23, 2017, 8 pages.
"Office Action Issued in Korean Patent Application No. 10-2014-7006657", dated Jan. 31, 2018, 6 Pages.
"Office Action Issued in European Patent Application No. 11872418.6", dated Dec. 20, 2017, 4 Pages.
"Non Final Office Action Issued in U.S. Appl. No. 15/788,993", dated Jun. 27, 2018, 11 Pages.
"Office Action Issued in Japanese Patent Application No. 2016-160091", dated Sep. 12, 2017, 7 Pages.
"Office Action Issued in Japanese Patent Application No. 2016-160091", dated Jun. 19, 2018, 8 Pages.
"Office Action Issued in European Patent Application No. 11872418.6", dated Nov. 10, 2018, 4 Pages.
"Final Office Action Issued in U.S. Appl. No. 15/788,993", dated Nov. 8, 2018, 9 Pages.

\* cited by examiner

APPLICATION BASED HARDWARE IDENTIFIERS

BACKGROUND

Situations can arise where it is desirable for a service provider to associate particular devices with a user or user's account. For example, a user may desire to access certain content, such as music, movies, and so forth, and the user requests or otherwise permits the service provider to associate one or more devices with him or her (or his or her) account. This association allows the user to access the content using those one or more devices, and also allows the service provider to allow use of the content only on devices that have been authorized.

Each device may have a device identifier that can be used by service providers to maintain this association, but the same device identifier is typically used by service providers communicating with multiple applications on the device. For example, service providers typically have access to the device identifier, and can leverage that device identifier to track information regarding usage of the device across multiple applications on the device. The tracked information can be used in various manners, such as by behavioral tracking software to provide advertisements for display on the device. This tracking, however, can be contrary to the user's privacy expectations and desires. Thus, it remains difficult for service providers to associate one or more of a user's devices with the user or user's account as requested or otherwise permitted by the user but without violating the user's privacy expectations and desires.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, application information for an application on a device is obtained, and device information including information for one or more hardware components of the device is also obtained. An identifier of the device is generated based on both the device information and the application information, and the identifier of the device is returned.

In accordance with one or more aspects, in a system a device identifier of a device is obtained from the device. The device identifier is generated based on both application information for an application on the device and device information including information for one or more hardware components of the device. The device identifier is used by the system to identify the device.

In accordance with one or more aspects, a nonce and a request for a device identifier of a device are received from a service provider. The device identifier is requested from a trusted component of the device, and the nonce is provided to the trusted component with the request. Digitally signed data is received from the trusted component, the digitally signed data including the nonce and the device identifier. The device identifier is generated based on both application information for the application and device information including information for multiple hardware components of the device. The digitally signed data is returned to the service provider. The nonce can be used by the service provider in a variety of different manners, such as to verify the request and protect against replay attacks.

BRIEF DESCRIPTION OF THE DRAWINGS

The same numbers are used throughout the drawings to reference like features.

DETAILED DESCRIPTION

Application based hardware identifiers are discussed herein. A device identifier, also referred to as an application based hardware identifier, is generated for an application on a device. The application based hardware identifier is generated based on both information describing the application and information describing one or more hardware components of the device. The application based hardware identifier can also optionally be based on an identifier of a user of the device (e.g., an account name or logon name). As the application based hardware identifier is based in part on the application information, different device identifiers are generated for applications on a device having different application information (e.g., different names and/or publishers). In situations in which the application based hardware identifier is based in part on the user of the device, different device identifiers are generated for applications on the device having different application information and/or for different users of the device.

A service provider accessible to the device over the Internet or other network can provide content and/or other functionality to an associated application on the device. For example, the service provider may provide music, books, videos, etc., for playback on the device, support or customer assistance functionality, and so forth. The associated application obtains an application based hardware identifier from a trusted component of the device, and provides the application based hardware identifier to the service provider. The service provider can associate the application based hardware identifier with the user (or user account of the user)

currently using the device, and thus know which devices are associated with the user or user account and can provide content or other functionality accordingly. However, different service providers will have different associated applications and thus will receive different application based hardware identifiers for the same device. Thus, each service provider (as well as its associated application) has no knowledge of the identifier of the device as used by other service providers and their associated applications.

Figure 1:
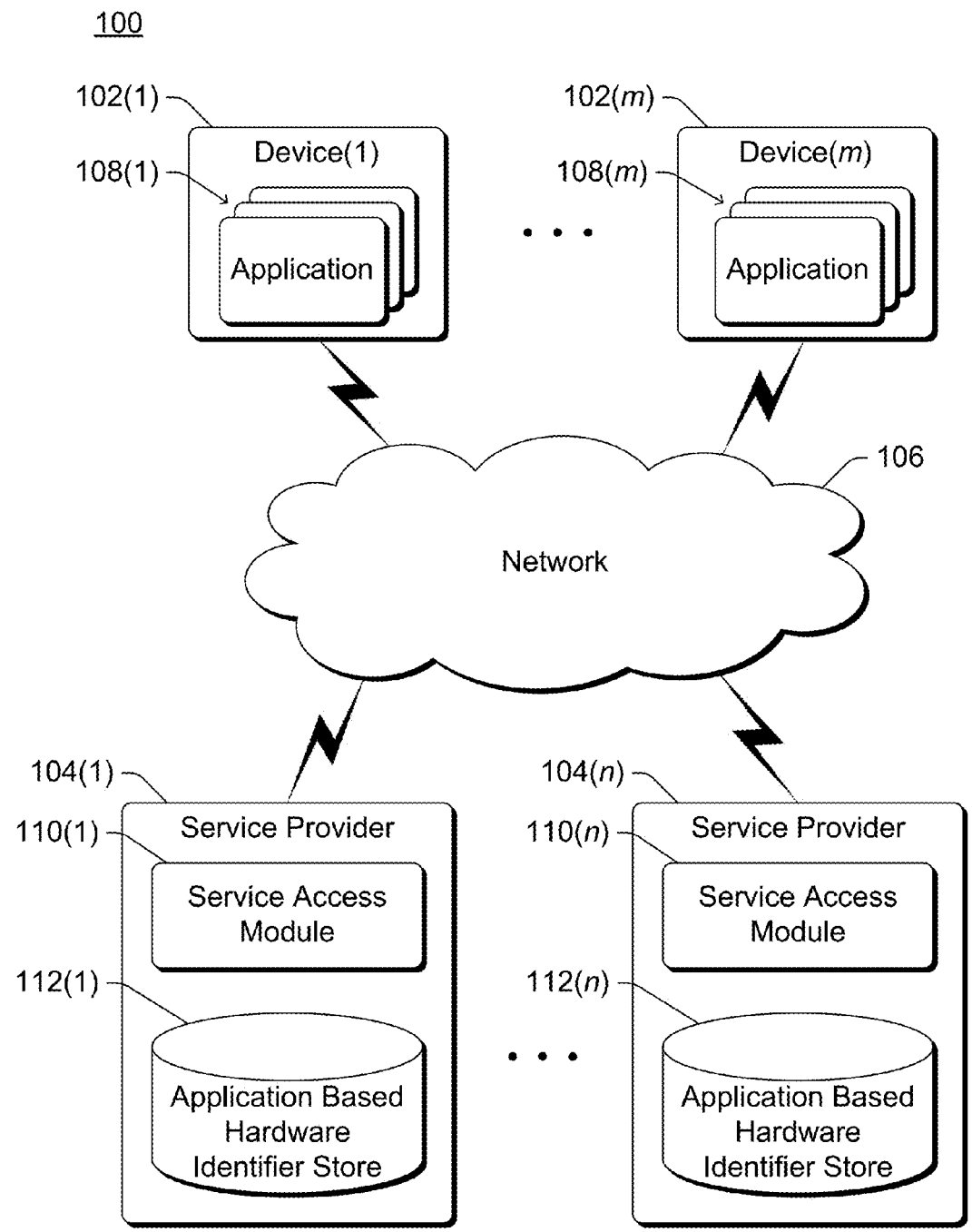
FIG. 1 illustrates an example system implementing the application based hardware identifiers in accordance with one or more embodiments.

FIG. 1 illustrates an example system 100 implementing the application based hardware identifiers in accordance with one or more embodiments. System 100 includes multiple (m) devices 102(1), . . . , 102(m) that can communicate with one or more of multiple (n) service providers 104(1), . . . , 104(n) via a network 106. Network 106 can be a variety of different networks, including the Internet, a local area network (LAN), a phone network, an intranet, other public and/or proprietary networks, combinations thereof, and so forth.

Each device 102 can be a variety of different types of devices, including physical devices or virtual devices. Different devices 102 can be the same or different types of devices. For example, a device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an audio and/or video playback device, an automotive computer, and so forth. A device 102 can also be a virtual device, such as a virtual machine running on a physical device. A virtual machine can be run on any of a variety of different types of physical devices (e.g., any of the various types listed above). Thus, a device 102 may range from a full resource device with substantial memory and processor resources (e.g., personal computers, game consoles) to a low-resource device with limited memory and/or processing resources (e.g., traditional set-top boxes, handheld game consoles).

Each service provider 104 can be implemented using a variety of different types of devices. Each service provider 104 can be implemented using one or more server computers, and can be implemented using a variety of different types of devices ranging from full resource devices with substantial memory and processor resources to low-resource devices with limited memory and/or processing resources similar to the discussion of devices 102. Different service providers 104 can be implemented using the same or different types of devices.

Each device 102 includes one or more applications 108 that can be associated with one or more service providers 104 to provide various functionality to devices 102. Applications 108 are various software and/or firmware programs that can be run on one or more of devices 102. Each application 108 can be any set of instructions that can be executed, installed, interpreted, or otherwise run on a device 102. Applications 108 can include applications installed on a device 102, applications copied to and run on a device 102 without installation, scripts run on a device 102, and so forth. Applications 108 can include an operating system of device 102 and/or other applications run by an operating system or other application of device 102.

Each application 108 can obtain an identifier of the device 102 on which the application 108 is installed or deployed, the identifier of the device also being referred to as an application based hardware identifier. The application based hardware identifier is obtained from a trusted module of the device 102, such as a module of an operating system of the device 102. A trusted module refers to a module that is trusted by another module or system (e.g., a service provider 104) to be a module that cannot be spoofed or impersonated by another module or application. The application based hardware identifier for a device 102 is generated based on the particular application that obtains the identifier and one or more hardware components of the device on which the particular application is installed or deployed. Different applications 108 on the same device 102 can have different application based hardware identifiers, depending on the application information used to generate the application based hardware identifiers as discussed in more detail below.

Multiple requests to generate an application based hardware identifier for an application will result in the same application based hardware identifier being generated if the hardware components of the device have not changed between requests. If the hardware components of the device have changed, then different application based hardware identifiers can be generated for the same application, depending on the hardware components used to generate the application based hardware identifier as discussed in more detail below. Furthermore, it should be noted that as the application based hardware identifier is generated based on the particular application and one or more hardware components of the device, re-installation of an application and/or operating system on a device does not alter the application based hardware identifier because neither the application nor the hardware components of the device have changed. Updating versions of the application may or may not alter the application based hardware identifier. If the version of the application is included as part of the application information used for generating the application based hardware identifier then updating versions of the application alters the application based hardware identifier. However, if the version of the application is not included as part of the application information used for generating the application based hardware identifier then updating versions of the application does not alter the application based hardware identifier.

Service provider 104 includes a service access module 110 and an application based hardware identifier store 112. Service access module 110 provides an interface for communication between applications 108 and service provider 104. Various requests and data can be communicated between applications 108 and service provider 104, such as requests for an application based hardware identifier, requests to access content, content licensed to a user of a device 102 being transferred to that device 102, and so forth.

Application based hardware identifier store 112 maintains a record of application based hardware identifiers associated with particular users or user accounts. Service provider 104 can use the application based hardware identifier in various manners, which can vary for different service providers 104. For example, a service provider 104 may stream audio data to devices 102 and allow only a particular number of devices 102 to stream audio data associated with a particular user or user account. Service provider 104 can maintain a record in store 112 of the application based hardware identifiers of the devices 102 associated with the particular user or user account, allowing a requesting device 102 to stream audio data associated with the particular user or user account only if an application based hardware identifier received from the requesting device 102 is included in store 112. By way of another example, a service provider 104 may license movies to users for playback on devices 102 and allow only a particular number of devices 102 to play back movies associated with a particular user or user account. Service provider 104 can maintain a record in store 112 of the application based hardware identifiers of the devices 102 associated with the particular user or user account, allowing a requesting device 102 to play back a movie associated with the particular user or user account only if an application based hardware identifier received from the requesting device 102 is included in store 112. This record in store 112 further allows service provider 104 to deliver content only to applications that service provider 104 wishes to enable to use the content-other applications attempting to use the services of service provider 104 will generate different identifiers from those in store 112 that can be identified and ignored by service provider 104.

By basing the application based hardware identifier of a device 102 on application information for a particular application 108, a service provider 104 has no knowledge whether an application based hardware identifier generated for one application 108 refers to the same device 102 as an application based hardware identifier generated for another application 108. Thus, any information being used by one application 108 or its associated service provider 104 would not be identifiable to another application 108 or its associated service provider 104 even though both applications 108 are on the same device and/or the associated service providers 104 are the same service provider 104.

For example, assume both an application A on device B and an application C on device B host advertisement code for a service provider 104, and that service provider 104 uses information regarding the usage of application A and the usage of application C to provide advertisements to a user on device B. Usage information for application A would be associated with the application based hardware identifier generated for application A, and usage information for application C would be associated with the application based hardware identifier generated for application C. Thus, because the usage information for applications A and C are associated with different application based hardware identifiers, service provider 104 would not be able to make use of the usage information of application A when providing advertisements for application C, and would not be able to make use of the usage information of application C when providing advertisements for application A. This results in increased user privacy due to the inability of the service provider to track usage information across the different applications.

The application based hardware identifier of a device 102 can also optionally be based on a user (e.g., a user identifier) of device 102. By basing the application based hardware identifier of a device 102 on a particular user identifier, service provider 104 is not aware of the application based hardware identifiers generated for different users of device 102 even if generated for the same application 108. Thus, an application 108 and a service provider 104 have no knowledge whether an application based hardware identifier generated for a user of device 102 refers to the same device 102 as an application based hardware identifier generated for a different user of device 102. Thus, any information being used by an application 108 or its associated service provider 104 for one user would not be identifiable to that application 108 or its associated service provider 104 for a different user.

For example, assume an application A on device B hosts advertisement code for a service provider 104, and that service provider 104 uses information regarding the usage of application A to provide advertisements to a user on device B. The service provider 104 would associate the usage information of the application A by a user F with the application based hardware identifier generated for user F and application A, and would associate the usage information of the application A by a user G with the application based hardware identifier generated for user G and application A. Thus, because the usage information for users F and G are associated with different application based hardware identifiers, service provider 104 would not be able to make use of the usage information of user F when providing advertisements for user G, and would not be able to make use of the usage information of user G when providing advertisements for user F. This results in increased user privacy due to the inability of the service provider to track usage information across the different users, even though they are using the same application.

In the discussions herein, reference is made to application based hardware identifiers being used by service providers 104. However, it should be noted that in some situations service providers 104 need not be aware of the application based hardware identifiers. For example, the application based hardware identifiers can be used by applications 108 that do not have associated service providers and/or without notifying associated service providers 104 of the application based hardware identifiers.

In the discussions herein, tracking of some information regarding a user (e.g., application usage information) can be performed, although the techniques discussed herein result in increased user privacy despite such tracking due to the inability of the service provider to track usage information across different applications and/or different users. In one or more embodiments, the tracking of information is performed only after receiving user consent to do so. This user consent can be an opt-in consent, where the user takes an affirmative action to request that the tracking be performed before the service provider 104 or application 108 performs any tracking of that user. Alternatively, this user consent can be an opt-out consent, where the user takes an affirmative action to request that the tracking of that user not be performed by the service provider 104 or application 108. If the user does not choose to opt out of this tracking, then it is an implied consent by the user to perform the tracking. It should be noted that in some situations the functionality provided by applications 108 and/or service providers 104 to users that do not consent to being tracked is less than the functionality provided be applications 108 and/or service providers 104 to users that do consent to being tracked.

Figure 2:
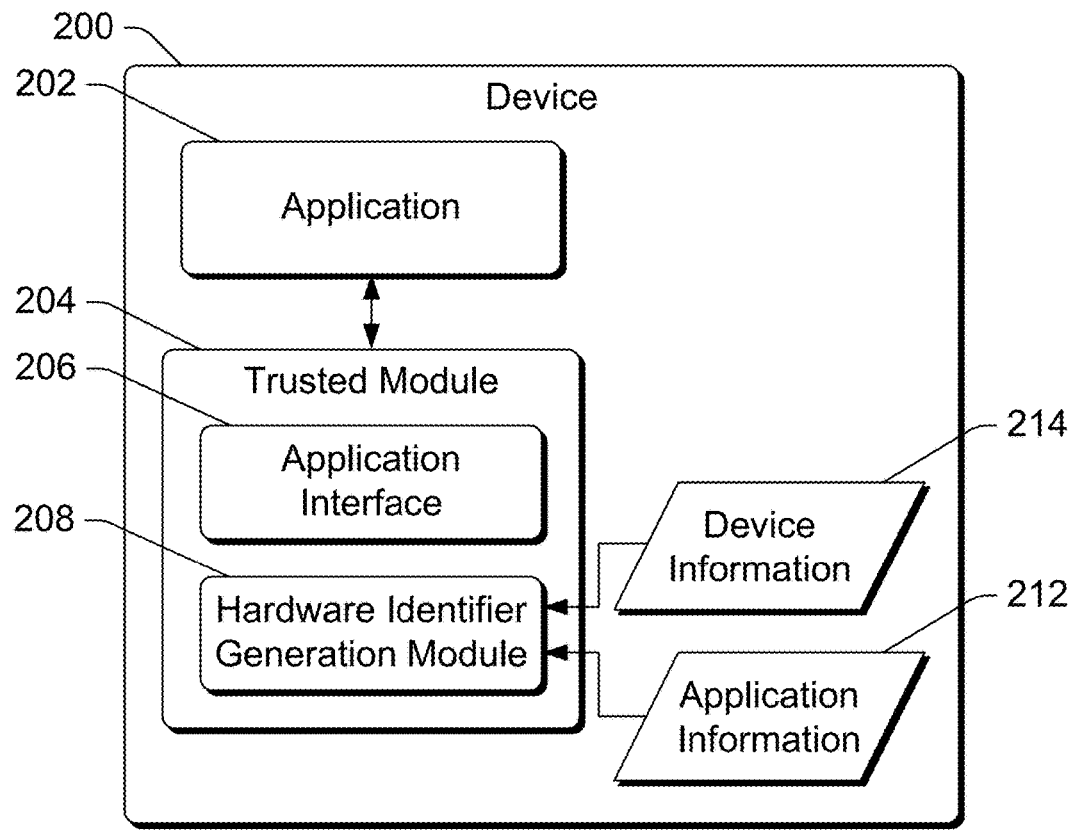
FIG. 2 is a block diagram illustrating an example device implementing the application based hardware identifiers discussed herein.

FIG. 2 is a block diagram illustrating an example device 200 implementing the application based hardware identifiers discussed herein. Device 200 can be, for example, a device 102 of FIG. 1. Device 200 includes an application 202 and a trusted module 204. Application 202 can be, for example, an application 108 of FIG. 1. Application 202 can be an application run by an operating system or other application (e.g., Web browser) of device 200, or can alternatively be other types of programs, such as programs that are part of an operating system of device 200. Trusted module 204 is a module that is trusted (e.g., by service provider 104 of FIG. 1) as providing accurate information and being difficult for malicious programs to compromise. Trusted module 204 can be part of an operating system running on device 200, or alternatively can be separate from the operating system.

Application 202 can be received by device 200 from any of a variety of sources, including remote sources and/or local sources. Remote sources, such as an application store, Web site, or service provider, can be accessed via a variety of different networks, such as the Internet, LAN, a phone network, an intranet, other public and/or proprietary networks, combinations thereof, and so forth. Local sources can be a variety of different storage devices, such as a magnetic disk, an optical disc, a Flash memory device, and so forth. Local sources can be included as part of device 200, can be removable devices that are coupled to and de-coupled from device 200, can be devices coupled to computing device 200 via a wired and/or wireless connection, and so forth.

Trusted module 204 includes an application interface 206 and a hardware identifier generation module 208. Application interface 206 is exposed to application 202, allowing application 202 to invoke functionality of trusted module 204 including requesting an application based hardware identifier. Application interface 206 can be implemented as various different types of interfaces, such as an application programming interface (API).

Hardware identifier generation module 208 generates an application based hardware identifier for application 202 on device 200. Module 208 can generate the application based hardware identifier in response to a request for the application based hardware identifier from application 202. Module 208 can additionally or alternatively generate the application based hardware identifier at other times, such as when application 202 is installed on or deployed to device 200, during times of low processor usage, in response to requests from other components or modules, and so forth.

Hardware identifier generation module 208 generates an application based hardware identifier based on both application information (information for application 202) and device information (device information for a particular hardware component of device 200). Module 208 can also optionally generate the application based hardware identifier based on a user identifier (a user of device 200). The application information, device information, and optionally user identifier are combined by module 208 to generate an application based hardware identifier that identifies a combination of application 202 and device 200 (and optionally a user of device 200).

The application information is application information 212 of application 202. Application information 212 can be obtained by module 208 in any of a variety of different manners, such as being generated by module 208, being retrieved from an identifier store on device 200, and so forth. Application information 212 can be generated for or assigned to application 202 using any of a variety of techniques that result in different applications on device 200 having different application information.

In one or more embodiments, application 202 is included in a package for deployment or installation on device 200, and the package includes one or more components or modules for application 202 (and optionally one or more additional applications). These components or modules can include binary code that is executed as part of application 202 or code that is interpreted or otherwise processed as part of application 202, text or images that are part of (resources of) application 202 or other data that is part of application 202, a library that is part of or used by application 202, and so forth. The application information 212 can be a package identifier of the package including application 202.

Figure 3:
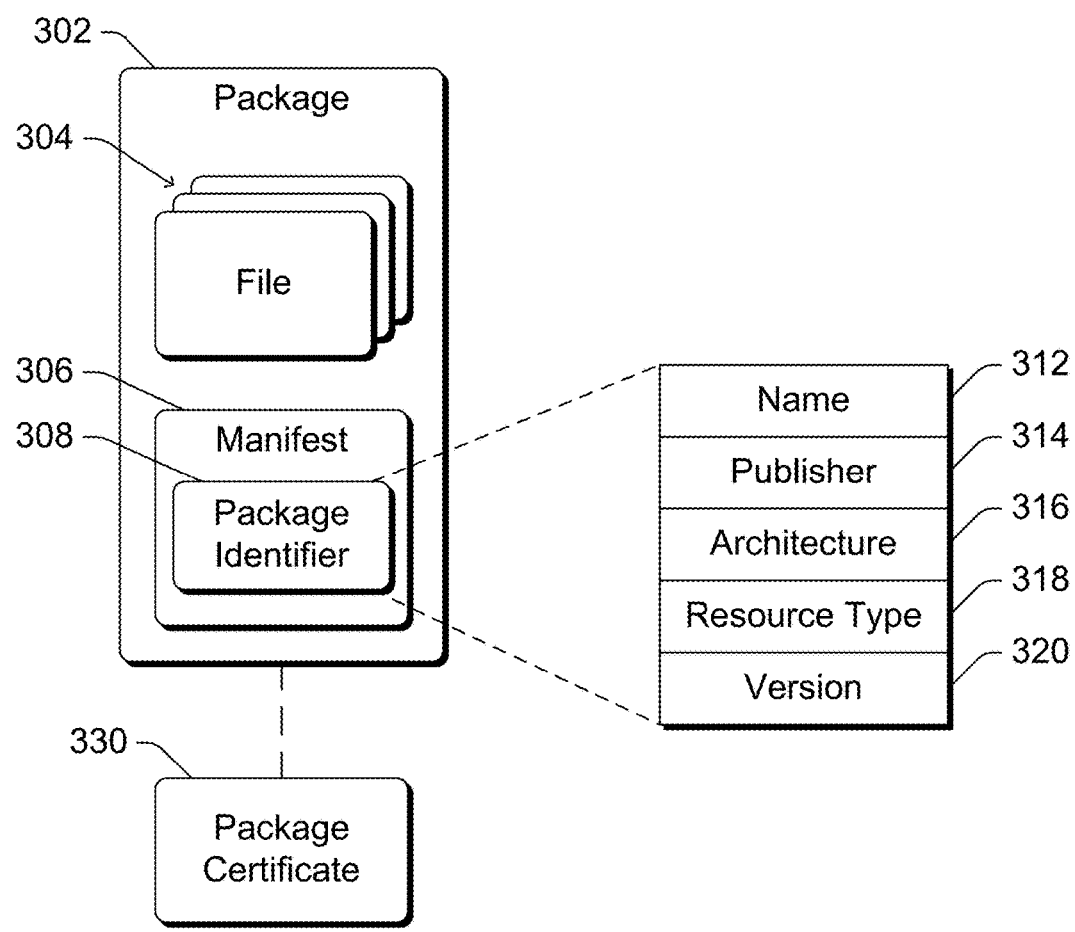
FIG. 3 illustrates an example package in accordance with one or more embodiments.

FIG. 3 illustrates an example package in accordance with one or more embodiments. A package 302 includes one or more files 304, which can include various components or modules for one or more applications (e.g., for application 202 of FIG. 2). Package 302 also includes a manifest 306 that includes various metadata indicating actions to be taken to install package 302. Manifest 306 is associated with package 302 and identifies how to install the package, such as which files are to be written to disk, what configuration values are to be set (e.g., in an operating system registry or store, in another database or record, etc.), and so forth.

Manifest 306 includes a package identifier 308, which includes various elements. In the illustrated example, the elements of package identifier 308 are a name 312, a publisher 314, an architecture 316, a resource type 318, and a version 320. Name 312 is a name assigned to package 302 by the developer of package 302. The developer can choose any name they desire, such as a name identifying the one or more applications included in package 302. Publisher 314 is a name of the publisher of package 302 (also referred to as the publisher of the application included in package 302 for deployment), such as the developer or distributor of package 302. The publisher can identify various entities such as a corporation, an individual, etc. Architecture 316 refers to the processor and/or device architecture with which the components or modules of package 302 are designed to operate. The developer can choose one or more architecture identifiers to include as architecture 316. Various different processor and/or device architectures can be identified, such as an x86 architecture, an x64 architecture, a RISC (reduced instruction set computer architecture), and so forth. Version 320 is a version identifier of package 302 (and can also refer to a version of the one or more applications included in package 302). The developer can choose any versioning indications (e.g., numeric sequences, alphanumeric sequences, etc.) that they desire.

Resource type 318 can be any of a variety of different values or attributes identifying characteristics of package 302. The developer can choose any characteristics that they desire. These characteristics can include, for example, the country or geographic region in which the components or modules of package 302 are designed to operate, the language (e.g., English, French, Japanese, etc.) that the components or modules of package 302 use, a form factor (e.g., desktop/laptop, tablet/slate, etc.) for which the components or modules of package 302 are designed to operate, one or more screen resolutions for which the components or modules of package 302 are designed to operate, whether the package 302 includes trial versions or fully licensed versions of applications, and so forth.

Although illustrated as including a name 312, a publisher 314, an architecture 316, a resource type 318, and a version 320, it should be noted that in other embodiments package identifier 308 can include other combinations of elements. For example, in some embodiments additional elements (not shown) can be included in package identifier 308. By way of another example, in some embodiments one or more of these elements (e.g., architecture 316, resource type 318, and/or version 320) may not be included in package identifier 308.

A package certificate 330 is also associated with package 302. Package certificate 330 is a digital certificate that can be generated in a variety of conventional manners, such as by a trusted entity digitally signing package 302 and/or manifest 306 using public key cryptography. Package certificate 330 includes an identifier of the publisher of package 302, which can be verified as being the same as publisher 314 when installing package 302.

The files 304 included in package 302, as well as the components or modules included in each file 304, are determined by the developer of package 302. For example, a developer could choose to distribute word processing and spreadsheet applications separately, creating one package for the word processing application and another package for the spreadsheet application. In such situations, these two packages have different package identifiers, so different package identifiers would be used when using the word processing and spreadsheet applications. Alternatively, a developer could choose to distribute word processing and spreadsheet applications together as a suite of applications, creating a single package including both the word processing and spreadsheet applications. In such situations, the single package has a package identifier, so the same package identifier would be used when using the word processing and/or spreadsheet applications.

Returning to FIG. 2, application information 212 can be included in a package store of device 200. When installed on or otherwise deployed to device 200, various information regarding the package that includes application 202 is stored in the package store, including an identification of the package (e.g., the package identifier 308 of FIG. 3) and the manifests associated with the package installed on or otherwise deployed to computing device 200. The package identifiers in the package store are maintained in a protected manner, allowing the package identifiers to be accessed by an operating system (or other trusted components) of device 200 but not by other programs running on device 200. The package identifiers can be protected in a variety of different manners, such as maintaining the package store in a location of memory that is only accessible to the operating system (or other trusted components) of device 200, storing package identifiers in a data structure that is encrypted using a key known only to the operating system (or other trusted components) of device 200, and so forth.

In one or more embodiments, the package identifier (e.g., a package identifier 308 of FIG. 3) of a package including application 202 is used as the application information 212 of the application. Alternatively, one or more parts of the package identifier can be used as the application information 212 of the application. For example, the publisher of the application (e.g., publisher 314 of FIG. 3) and/or the name of the application (e.g., name 312 of FIG. 3) can be used as the application information 212 of the application.

For example, application information 212 can be the name of application 202 and the publisher of application 202 (e.g., concatenated or otherwise combined together). In this example, the application based hardware identifier generated by hardware identifier generation module 208 would be different for each application on device 200 having a different publisher and/or name. As application information 212 does not include version information in this example, module 208 would generate the same application based hardware identifier for different versions of application 202. By way of another example, application information 212 can be the publisher of application 202. In this example, the application based hardware identifier generated by hardware identifier generation module 208 would be different for each application on device 200 having a different publisher, but would be the same for each application on device 200 having the same publisher (regardless of whether the application names were the same and regardless of the versions of the applications).

Alternatively, application information 212 can be generated or otherwise obtained in other manners and need not be based on a package identifier. For example, application information 212 can be an identifier assigned by an operating system or other program of device 200 when application 202 is installed on, downloaded to, or otherwise placed on device 200. Such an identifier can be assigned by the operating system or other program using various rules or criteria, such as a hash value generated by hashing at least a portion of a module of application 202, a hash value generated by hashing a name and version of application 202, a value incremented each time an application is installed on, downloaded to, or otherwise placed on device 200, a value received from a source of application 202, and so forth. By way of another example, application information 212 can be generated based on information supplied by application 202. An application 202 can communicate an indication of application information to trusted module 204 (e.g., with a digital signature and certificate to allow trusted module 204 to verify that the indication can be trusted) while application 202 is running on device 200.

In one or more embodiments, application information 212 is strongly associated with application 202. This strong association refers to the application information 212 being associated with application 202 in a manner that prevents one application from impersonating another application. This strong association thus makes it difficult for a malicious application or user to spoof the application information. This strong association can be implemented in various manners. For example, this strong association is inherent in application information obtained from the package identifier, can be inherent in application information generated by an operating system trusted to maintain such a strong association, and so forth.

As indicated above, in addition to application information 212 hardware identifier generation module 208 also generates the application based hardware identifier based on device information. The device information is received as device information 214. Device information 214 is information for one or more hardware components of device 200. Information regarding various different hardware components of device 200 can be included in device information 214.

Table I illustrates an example of different hardware components and types of information regarding those hardware components that can be received as device information 214. It should be noted that the hardware components and types of information listed in Table I are examples, and that other types of hardware components and/or other types of information regarding the hardware components can be received as device information 214. It should also be noted that device information 214 can include a subset of the hardware components listed in Table I rather than all of the hardware components listed in Table I.

TABLE I

| Hardware Component | Information |
| --- | --- |
| Processor | Central Processing Unit (CPU) identifier (ID) of one or more processors of the device. |
| Memory | Size of the memory of the device. |
| Disk Device | Serial number of the hard drive of the device. |
| Network Adapter | Address of a network adapter of the device, such as the Media Access Control (MAC) address of a network interface card of the device. |
| Audio Adapter | Serial number of an audio adapter of the device. |
| Docking Station | Serial number of a docking station coupled to the device. |
| Mobile Broadband | Identifier of the mobile broadband component of the device. |
| Bluetooth | Serial number of a Bluetooth component paired with the device. |
| System BIOS | Serial number of a BIOS (Basic Input/Output System) of the device. |

Device information 214 can be obtained in a variety of different manners. For example, information regarding the various different hardware components can be maintained in a store and retrieved by hardware identifier generation module 208. The store can be implemented as a database, a registration store (e.g., an operating system registry), a table, and so forth. By way of another example, information regarding the various different hardware components can be retrieved from those hardware components and/or other modules of device 200 (e.g., an operating system of device 200) when requested by hardware identifier generation module 208.

In one or more embodiments, device information 214 is obtained from a cache or other store of device 200. A component or module of device 200 updates this cache or store as some of the information regarding different hardware components of device 200 changes, but not as information regarding other hardware components of device 200 changes. For example, information regarding the memory, Bluetooth, and the network adapter hardware components may change due to changes in power mode by device 200 (e.g., by having certain components powered down to conserve power). To keep such changes from resulting in different application based hardware identifiers, the cache or store of information for the memory, Bluetooth, and network adapter hardware components are not changed even though the information may change.

It should be noted that, as discussed above the techniques described herein can be implemented on virtual devices. In such situations, device information 214 is information for one or more virtual hardware components. Thus, the application based hardware identifier is generated based on information for one or more virtual hardware components, resulting in different application based hardware identifiers for different virtual machines even if running on the same physical device.

As indicated above, in addition to application information 212 and device information 214, hardware identifier generation module 208 can optionally generate the application based hardware identifier based on a user identifier. The user identifier refers to an identifier of a user of device 200. The user can be a current user of the device, or can alternatively be one or more other user identifiers known to or otherwise accessible to trusted module 204. The user identifier can be, for example, the user identifier used by a user to log onto device 200, the user identifier used by the user to log onto a service provider (e.g., a service provider 104 of FIG. 1), and so forth. The identifier of the current user can be obtained in a variety of different manners. For example, the identifier of the current user can be maintained by and received from another module of device 200 (e.g., of an operating system of device 200), can be maintained in and retrieved from a store (e.g., a registration store (e.g., operating system registry), a table, a database, etc.), can be maintained by and received from a service provider 104, and so forth.

Figure 4:
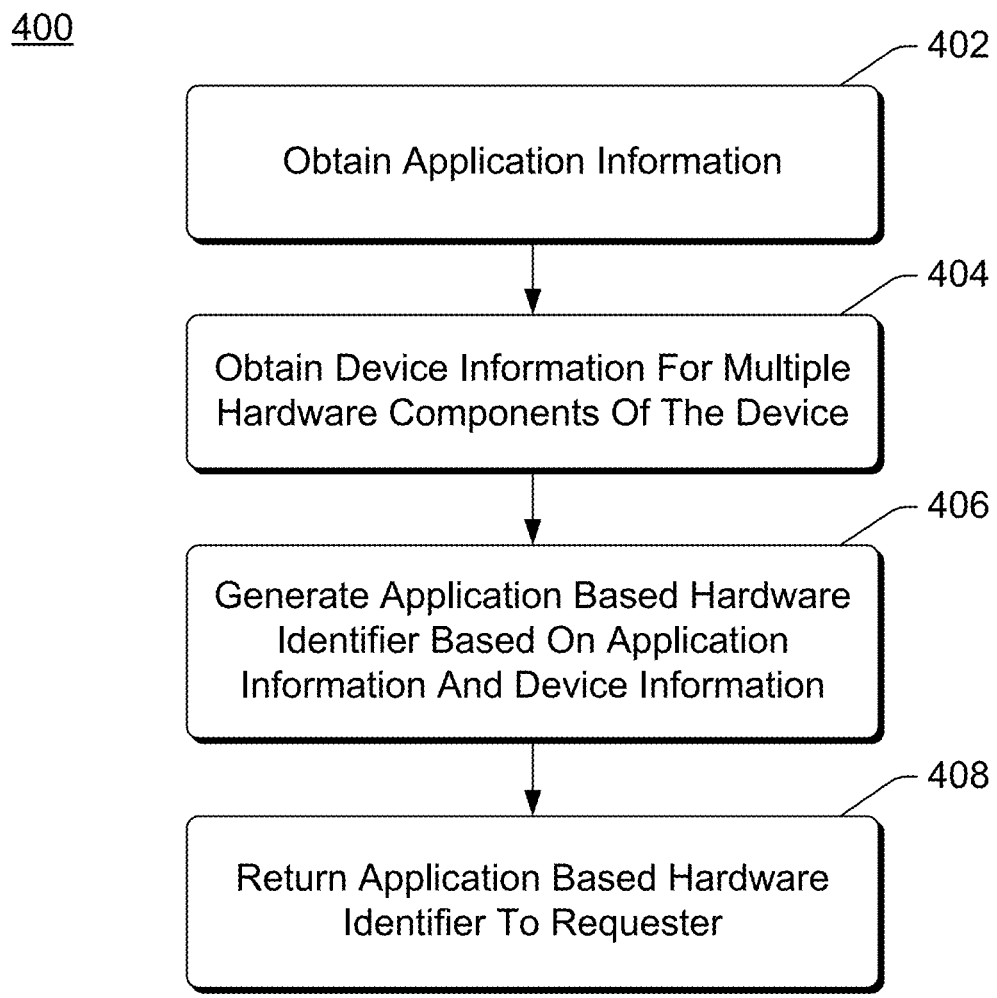
FIG. 4 is a flowchart illustrating an example process for generating an application based hardware identifier in accordance with one or more embodiments.

FIG. 4 is a flowchart illustrating an example process 400 for generating an application based hardware identifier in accordance with one or more embodiments. Process 400 is carried out by a hardware identifier generation module (such as hardware identifier generation module 208 of FIG. 2) of a device (such as a device 102 of FIG. 1 or device 200 of FIG. 2), and can be implemented in software, firmware, hardware, or combinations thereof. Process 400 is shown as a set of acts and is not limited to the order shown for performing the operations of the various acts. Process 400 is an example process for generating an application based hardware identifier; additional discussions of generating an application based hardware identifier are included herein with reference to different figures.

In process 400, application information is obtained (act 402). The application information is, for example, application information 212 of FIG. 2.

Device information for multiple components of the device is also obtained (act 404). This device information is, for example, device information 214 of FIG. 2.

The application based hardware identifier is generated based on the application information and device information (act 406). The application information and device information are used to generate an application based hardware identifier from which the application information and device information cannot be readily individually extracted. The application information and device information are tied together in a manner so that another entity (e.g., an application, a service provider, a user, etc.) is not able to separate, from the application based hardware identifier, the device information.

It should also be noted that, by basing the application based hardware identifier on the application information, a different application based hardware identifier is generated for each application having different application information (e.g., each different application 108 on a device 102 of FIG. 1), preventing applications from sharing application based hardware identifiers.

The application based hardware identifier is returned to a requester as an identifier of the device (act 408). In one or more embodiments the requester is an application on the device implementing process 400 (the application for which application information is obtained in act 402), although the application may be requesting a device identifier in response to a request from another entity (e.g., a service provider). It should be noted that the application based hardware identifier can be generated in response to a request for the application based hardware identifier from the requester, or alternatively at other times as discussed above.

Figure 5:
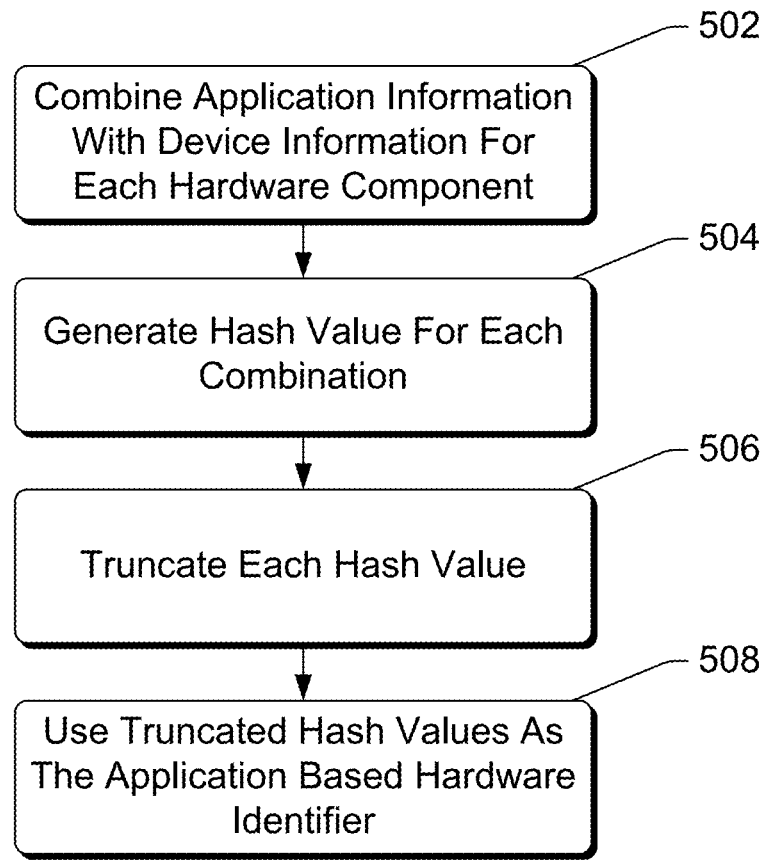
FIG. 5 is a flowchart illustrating an example process for generating an application based hardware identifier based on application information and device information in accordance with one or more embodiments.

FIG. 5 is a flowchart illustrating an example process 500 for generating an application based hardware identifier based on application information and device information in accordance with one or more embodiments Process 500 illustrates an example of act 406 of FIG. 4.

In process 500, the application information is combined with the device information for each hardware component (act 502). As discussed above, the device information is information for one or more hardware components of the device. For each of these one or more hardware components, the information for the hardware component is combined with the application information.

The application information and the information for a hardware component can be combined in a variety of different manners. In one or more embodiments, the application information is concatenated with the information for each hardware component. Alternatively, the application information can be combined with the information for each hardware component in other manners, such as by selecting characters in groups alternating between the application information and the information for the hardware component, selecting particular characters and/or particular bits of codes (e.g., Unicode) encoding characters of the application information and the information for the hardware component (e.g., even bits of the encodings of the characters, odd bits of the encodings of the characters, etc.), exclusive-OR'ing the bits of codes encoding characters of the application information and the information for the hardware component, and so forth.

For example, assume the application information is "ABCD12345" and the device information includes information of "xyz890" as the CPU ID for the processor hardware component and the information of "64" as the size of the memory of the device for the memory hardware component. Following this example, if the application information and the information for a hardware component are combined using concatenation, then the combination of the application information and information for the processor hardware component would be "ABCD12345xyz890" or "xyz890ABCD12345", and the combination of the application information and information for the memory hardware component would be "ABCD1234564" or "64ABCD12345". However, if the application information and the information for a hardware component are combined by selecting characters in groups of one alternating between the application information and the information for the hardware component, then the combination of the application information and the identifier for the processor hardware component could be "A×ByCzD81920345" or "xAyBzC8D9102345", and the combination of the application information and information for the memory hardware component could be "A6B4CD12345" or "6A4BCD12345".

Regardless of the manner in which the application information and the device information for each hardware component is combined in act 502, a hash value is generated for each combination (act 504). In one or more embodiments, the hash function used to generate the hash values is a cryptographic hash function or a one-way hash function for which it is computationally infeasible to identify the input to the hash function (the combination of the application information and the device information for a hardware component) based on the hash value. Any of a variety of hash functions can be applied to the combination of the application information and device information to generate a hash value. For example, the hash function can be a secure hash algorithm (SHA) such as SHA-2, a message digest (MD) algorithm such as MD5, and so forth.

It should be noted that, by hashing the application information (or the combination of the application information and the device information for each hardware component) using a cryptographic hash function or a one-way hash function, the underlying application information is not readily identifiable from the hash value. Thus, although the application based hardware identifier is based on the application information, applications and/or service providers are not able to readily identify the application information. Similarly, by hashing the device information for hardware components (or the combination of the application information and the device information for each hardware component) using a cryptographic hash function or a one-way hash function, the underlying device information for the hardware components is not readily identifiable from the hash value. Thus, although the application based hardware identifier is based on the device information, applications and/or service providers are not able to readily identify the device information.

Each generated hash value is also optionally truncated or bytes thereof otherwise removed (act 506). The hash values can be truncated to remove a particular number of bytes, to achieve a particular truncated hash value size (e.g., 128 bits), and so forth. The bytes that are removed in act 506 can be determined in different manners, such as being the first bytes of the hash value, the last bytes of the hash value, bytes of the hash value selected randomly or according to other criteria, and so forth. Removing bytes from the hash values results in values that are more likely to be shared by different application and hardware component combinations, and thus reduces the uniqueness of the hash values to some degree. However, the number of situations in which different application information and hardware component combinations have the same value are relatively small, allowing the overwhelming majority of different application and hardware component combinations to have different values. Nonetheless, using this truncation a user's device is more difficult to track because of the possibility of the same value being generated for multiple different application information and hardware component combinations.

These truncated hash values are used as the application based hardware identifier (act 508). Thus, in the illustrated example of FIG. 5, the application based hardware includes multiple truncated hash values, each resulting from hashing a combination of the application information and information for a different hardware component.

Process 500 as illustrated includes generating the application based hardware identifier based on the application information and the device information. It should be noted that the application based hardware identifier can alternatively be generated based on additional information as well. For example, the application based hardware identifier can be generated based on a user identifier, which is an identifier of a current user of the device as discussed above. The user identifier can be combined with the application information and device information in act 502 in various manners, such as by concatenating the application information, user identifier, and the device information for each hardware component, by selecting characters in groups of one alternating between the application information, the user identifier, and the information for the hardware component, and so forth.

Process 500 as illustrated also includes combining the application information with device information for each hardware component in act 502. Alternatively, the application information can be combined with device information for multiple hardware components. For example, continuing with the example above in which the application information is "ABCD12345", and the device information includes information of "xyz890" as the CPU ID for the processor hardware component and the information of "64" as the size of the memory of the device for the memory hardware component, the application information and the information for both the processor hardware component and the memory hardware component can be combined using concatenation, resulting in a combination of, for example, "ABCD12345xyz89064", "ABCD1234564xyz890", "xyz89064ABCD12345", and so forth. A hash value for the combination of the application and device information for multiple hardware components can be generated and truncated, as discussed above.

Process 500 as illustrated includes truncating each hash value in act 506. It should be noted that the truncating of act 506 is optional and need not be performed in process 500. In one or more embodiments, some data is truncated or otherwise dropped from the application information and/or device information (and/or optionally the user identifier) prior to the combining of the application information and the device information (and optionally the user identifier) in act 502. For example, some bits (e.g., the first few, the last few, bits selected randomly or according or other criteria, etc.) can be deleted from the application information and/or the device information (and/or optionally the user identifier). Deleting some data from the application information and/or the device information (and/or optionally the user identifier) results in combined application information and device information (and optionally user identifier) that is more likely to be shared by different application information and hardware component (and optionally user identifier) combinations, and thus reduces the uniqueness of the application based hardware identifiers to some degree.

Alternatively, in other embodiments no truncating is performed. For example, a hash algorithm that results in a shorter hash value (e.g., 128 bits) could be used. Such a hash algorithm would result in generating hash values that are more likely to be shared by different application information and hardware component (and optionally user identifier) combinations, thus reducing the uniqueness of the hash values to some degree without truncating hash values.

Returning to FIG. 2, hardware identifier generation module 208 generates and makes the application based hardware identifier available to application interface 206. Application interface 206 returns the generated application based hardware identifier to the requester (e.g., application 202).

In addition to generating the application based hardware identifier, hardware identifier generation module 208 can optionally digitally sign the generated application based hardware identifier. In digitally signing the application based hardware identifier, a digital signature is generated that can be used by a requester (or other entity to which the application based hardware identifier is provided) to verify that the application based hardware identifier was indeed generated by hardware identifier generation module 208.

Any of a variety of different public and/or proprietary techniques can be used to digitally sign the application based hardware identifier. In one or more embodiments, the application based hardware identifier is digitally signed by generating a digital signature using the application based hardware identifier and a private key of a public/private key pair of hardware identifier generation module 208 (or of another component trusted by module 208). The private key of the public/private key pair is kept secret by module 208, but the public key of the public/private key pair is made known. Without the private key it is computationally very difficult to create a digital signature that can be verified using the public key. However, any entity with the public key can use the public key to verify the digital signature by executing a suitable digital signature verification algorithm on the public key, the digital signature, and the data that was digitally signed.

In addition to returning the application based hardware identifier, the digital signature can also be made available to application interface 206, which can return the digital signature along with the generated application based hardware identifier to the requester. A certificate associated with the public key of this public/private key pair can also be made available to application interface 206, which can return the certificate along with the digital signature to the requester. The certificate can be used to identify another entity (e.g., a certifying authority) that trusts the module or component that has the public/private key pair. The certificate can be used itself, or in conjunction with one or more additional certificates in a certificate chain, by a requester (or other entity to which the application based hardware identifier is provided) to verify that the certificate from hardware identifier generation module 208 can be trusted, and thus (in combination with verifying the digital signature) that the application based hardware identifier was indeed generated by hardware identifier generation module 208. Alternatively, the certificate need not be made available to application interface 206, but can be made available to the requester (or other entity to which the application based hardware identifier is provided) in other manners (e.g., from another device, from another service provider, and so forth).

In one or more embodiments, a nonce is provided to application interface 206 along with the request for the application based hardware identifier. The nonce is a value provided by the requester and can be generated in a variety of different manners (e.g., as a random or pseudorandom number). The nonce can be provided to hardware identifier generation module 208, digitally signed, and a digital signature of the nonce and the application based hardware identifier made available to application interface 206. The nonce can be returned to the requester, although alternatively is not returned as the nonce was received from the requester and the requester is thus able to verify the digital signature of the nonce based on its prior knowledge of the nonce. The requester can readily determine whether a response with a digital signature of a particular nonce returned with an application based hardware identifier has been previously returned to the requester, allowing the requester to protect against replay attacks. For example, if the requester receives an application based hardware identifier accompanied by a digital signature of a same nonce as accompanied a previously received application based hardware identifier, then the requester can assume that a replay attack or other improper action is being performed and can ignore the received application based hardware identifier.

Figure 6:
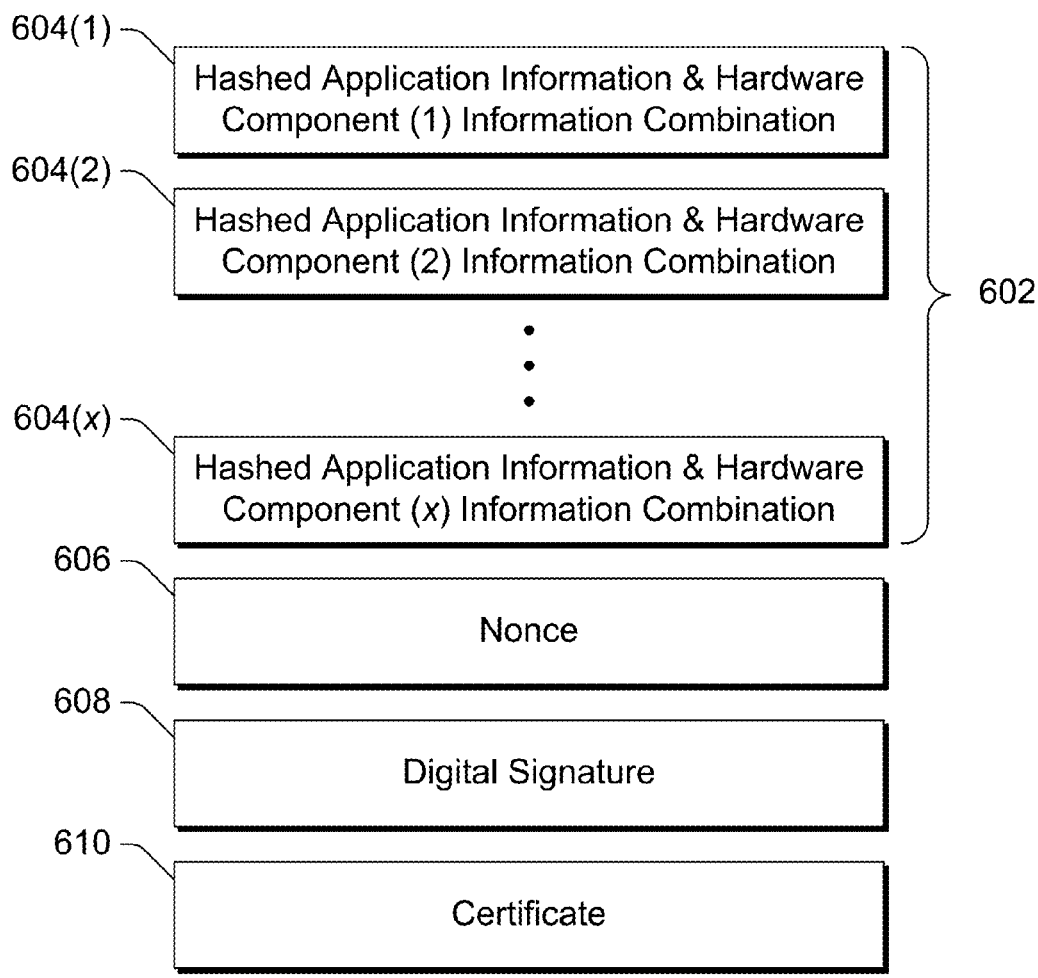
FIG. 6 illustrates example data that can be returned in response to a request for an application based hardware identifier in accordance with one or more embodiments.

FIG. 6 illustrates example data 600 that can be returned in response to a request for an application based hardware identifier in accordance with one or more embodiments. Data 600 includes an application based hardware identifier 602 having multiple (x) entries 604(1), . . . , 604(x). Each entry 604 is a hash (optionally truncated as discussed above) of a combination of application information and information for one of multiple (x) hardware components. Each entry 604 is generated as part of, for example, the application based hardware identifier generated in act 406 of FIG. 4 discussed above. Although each entry 604 is illustrated as being a hashed combination of application information and information for one hardware component, one or more entries can alternatively be a hashed combination of application information and information for multiple hardware components, or a hashed combination of application information, user identifier, and information for one or more multiple hardware components as discussed above.

Data 600 also includes a nonce 606, a digital signature 608, and a certificate 610. Nonce 606 is a value provided by a requester, as discussed above, to facilitate protecting against replay attacks. Digital signature 608 is a digital signature generated by digitally signing application based hardware identifier 602 and optionally nonce 606 as discussed above. Certificate 610 is a certificate associated with the public key of the public/private key pair (the public/private key pair of which the private key was used to generate digital signature 608) as discussed above.

It should be noted that data 600 includes separate entries 604 for the different hardware components (e.g., each of one or more hardware components listed in Table I discussed above). By returning individual hashed values for the individual hardware components, a service provider that receives the application based hardware identifier is able to pick and choose the hardware components that the service providers desire to use as identifier of the device, and need not use as the identifier of the device all of the hardware components.

In the example of FIG. 6, data 600 includes application based hardware identifier 602, nonce 606, digital signature 608, and certificate 610. Alternatively, different information can be included in data 600.

In one or more embodiments, the application information used to generate application based hardware identifier 602 can also be included in data 600, and digital signature 608 can be a digital signature generated by digitally signing application based hardware identifier 602, the application information, and optionally nonce 606. Data 600 with the digitally signed application information can be returned to a service provider (e.g., a service provider 104 of FIG. 1), allowing the service provider to verify the application information for the application providing the application based hardware identifier. This allows the service provider to take various actions, such as to ignore application based hardware identifiers from applications that the service provider does not desire to be able to use the services of the service provider, to ignore application based hardware identifiers received from random or malicious applications, and so forth.

In one or more embodiments, nonce 606 and/or certificate 610 need not be included in data 600. The nonce was provided with the request for an application based hardware identifier, and thus is already known to the requester and need not be returned to the requester as discussed above. The certificate associated with the public key of a public/private key pair can be obtained from various sources as discussed above, and thus need not be returned to the requester.

Figure 7:
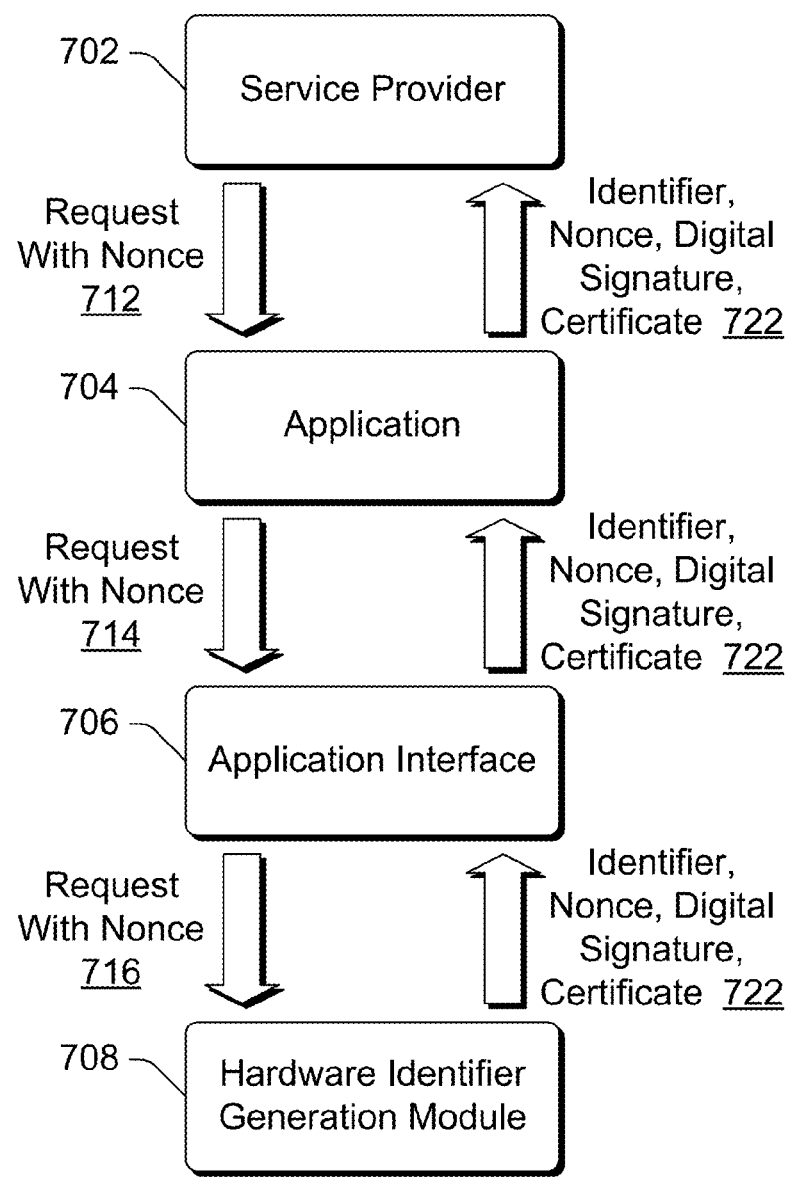
FIG. 7 illustrates an example system for using application based hardware identifiers in accordance with one or more embodiments.

FIG. 7 illustrates an example system 700 for using application based hardware identifiers in accordance with one or more embodiments. System 700 includes a service provider 702, an application 704, an application interface 706, and a hardware identifier generation module 708. Service provider 702 can be, for example, a service provider 104 of FIG. 1. Application 704 can be, for example, an application 108 of FIG. 1 or application 202 of FIG. 2. Application interface 706 can be, for example, an application interface 206 of FIG. 2. Hardware identifier generation module 708 can be, for example, a hardware identifier generation module 208 of FIG. 2.

In system 700, a request 712 for an identifier of the device running application 704 is provided by service provider 702, along with a nonce, to application 704. Request 712 can be initiated by service provider 702, or alternatively can be in response to a request initiated by another device or component (e.g., by application 704). Application 704 receives request and nonce 712, and in response provides a request for an identifier of the device running application 704, along with the received nonce, to application interface 706. Application interface 706 receives request and nonce 712, and in response provides a request for an identifier of the device running application 704, along with the received nonce, to hardware identifier generation module 708.

Module 708 generates an application based hardware identifier as discussed above, and returns the identifier, nonce, digital signature, and certificate 722 to application interface 706. The identifier, nonce, digital signature, and certificate are, for example, data 600 of FIG. 6. Application interface 706 receives the identifier, nonce, digital signature, and certificate 722, and in response provides the identifier, nonce, digital signature, and certificate 722 to application 704. Application 704 receives the identifier, nonce, digital signature, and certificate 722, and in response provides the identifier, nonce, digital signature, and certificate 722 to service provider 702. Alternatively, as discussed above, rather than returning the identifier, nonce, digital signature, and certificate 722, the nonce and/or certificate are optionally not returned.

Returning to FIG. 1, each service provider 104 includes a service access module 110, which receives the application based hardware identifiers from devices 102. These application based hardware identifiers can be maintained in an application based hardware identifier store 112 as associated with a particular user or user name (e.g., a user name that the user of the device 102 providing the application based hardware identifier logged into a device 102 and/or service provider 104 using).

Each service provider 104 can use the application based hardware identifiers in various manners. For example, service access module 110 can track how many different devices associated with a particular user or user name are accessing particular content, and permit only a particular number of different devices to access the particular content. By way of another example, service access module 110 can associate the application based hardware identifier with a particular device identified by the user (e.g., if service provider 104 is providing support to the user, and the user chooses to provide a serial number or other indication of the device for service provider 104 to associate with the application based hardware identifier).

In one or more embodiments, service provider 104 compares a received application based hardware identifier to previously received application based hardware identifiers to determine whether the received application based hardware identifier is for a same device as a previously received application based hardware identifier. For example, the service provider may allow only a particular number of different devices of a user to access content, in which case service provider 104 checks whether the received application based hardware identifier identifies a new device of the user or a device previously used by the user to access the content.

It should be noted that, as discussed above, the application based hardware identifier includes different parts for different hardware components, such as a different hashed (and optionally truncated) value for each combination of application information and information for one of multiple hardware components. Service provider 104 can use all of the hashed values to identify the device from which the application based hardware identifier was received, or a subset of the hashed values. By using a subset of the hashed values, service provider 104 allows some changes to be made to the device without treating the device as a different device.

In one or more embodiments, service provider 104 selects one or more of the hash values to use to identify the device. For example, the application based hardware identifier may include hashed values generated based on processor, memory, disk device, and docking station hardware components. However, service provider 104 may use the hashed values generated based on the processor, memory, and disk device hardware components. Thus, service provider 104 would identify a device from which the application based hardware identifier is received as being the same device regardless of whether the device is coupled to a docking station.

Alternatively, service provider 104 can use the hash values in different manners to identify the device. For example, each hardware component can be assigned a weight or score, and the hash value for the hardware component compared to the hash value of a previously received application based hardware identifier for the device. Different hardware components can have different weights or scores based on their perceived importance to the service provider. The weights or scores of the hash values in the received application based hardware identifier that are the same as the hash values in the previously received application based hardware identifier are added and compared to a threshold value. If the sum of the weights or scores satisfies (e.g., is equal to and/or greater than) the threshold value, then the received application based hardware identifier is determined to be for the same device as the previously received application based hardware identifier.

Additional information can also optionally be made available to service provider 104 to assist in determining how to use the application based hardware identifier to identify a device. This information can be included as part of the data returned to service provider 104 (e.g., included as part of data 600 of FIG. 6), or provided to service provider 104 from other components, modules, devices, and so forth. For example, a flag or other indicator can be made available to service provider 104 to identify hardware components for which information is likely to change (e.g., a docking station hardware component) or provide an indication of how likely (e.g., a probability) it is for the information for a hardware component to change. This flag or other indicator can then be used by service provider to determine whether, or how heavily, to rely on the information for the hardware component in identifying the device.

Figure 8:
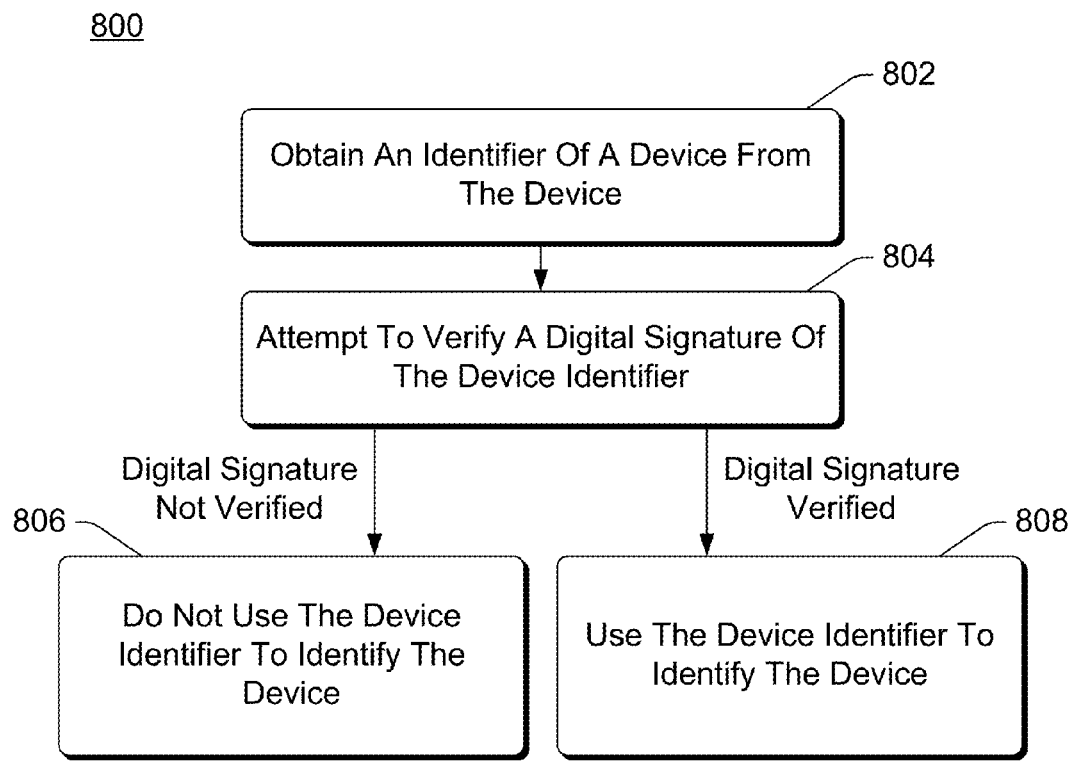
FIG. 8 is a flowchart illustrating an example process for using an application based hardware identifier in accordance with one or more embodiments.

FIG. 8 is a flowchart illustrating an example process 800 for using an application based hardware identifier in accordance with one or more embodiments. Process 800 is carried out by a service provider, such as service provider 104 of FIG. 1, and can be implemented in software, firmware, hardware, or combinations thereof. Process 800 is shown as a set of acts and is not limited to the order shown for performing the operations of the various acts. Process 800 is an example process for using an application based hardware identifier; additional discussions of using an application based hardware identifier are included herein with reference to different figures.

In process 800, an identifier of a device is received from the device (act 802). The device identifier received in act 802 is an application based hardware identifier that is generated based on both application information of an application of the device and device information including information for one or more hardware components of the device as discussed above. The application based hardware identifier can also be generated based on additional information, such as a user identifier of a user of the device as discussed above.

An attempt is made to verify a digital signature of the device identifier (act 804). Process 800 proceeds based on whether the digital signature is verified. If the digital signature is not verified, then the obtained device identifier is not used to identify the device (act 806). For example, access to content based on the device identifier can be denied.

However, if the digital signature is verified, then the obtained device identifier is used to identify the device (act 808). For example, the device identifier can be used to determine whether the device is permitted to access content. Additional checks may be performed to determine whether the device is permitted to access the content, such as determining a number of other devices already used by the current user of the device to access the content, determining whether the device identifier is for a same device as a previously received device identifier, and so forth.

Although particular functionality is discussed herein with reference to particular modules, it should be noted that the functionality of individual modules discussed herein can be separated into multiple modules, and/or at least some functionality of multiple modules can be combined into a single module.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 9:
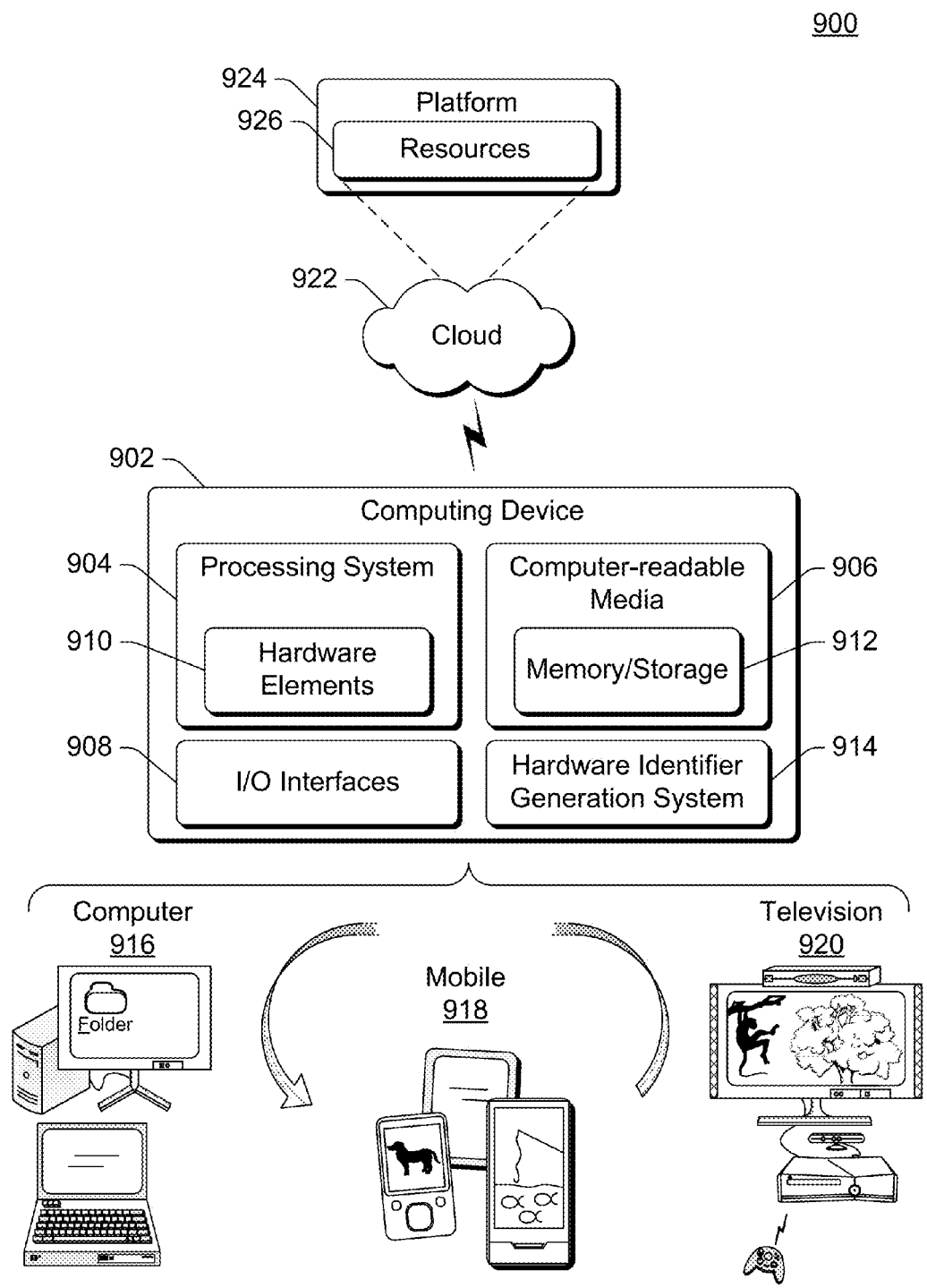
FIG. 9 illustrates an example system that includes an example computing device that is representative of one or more systems and/or devices that may implement the various techniques described herein.

FIG. 9 illustrates an example system generally at 900 that includes an example computing device 902 that is representative of one or more systems and/or devices that may implement the various techniques described herein. Computing device 902 may be, for example, a server of a service provider, a device associated with a client (e.g., a client device), an on-chip system, a virtual machine running on a server, and/or any other suitable computing device or computing system.

The example computing device 902 as illustrated includes a processing system 904, one or more computer-readable media 906, and one or more I/O Interfaces 908 that are communicatively coupled, one to another. Although not shown, computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 904 is representative of functionality to perform one or more operations using hardware. Accordingly, processing system 904 is illustrated as including hardware elements 910 that may be configured as processors, functional blocks, and so forth. This may include implementation in hardware as an application based integrated circuit or other logic device formed using one or more semiconductors. Hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable media 906 is illustrated as including memory/storage 912. Memory/storage 912 represents memory/storage capacity associated with one or more computer-readable media. Memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Computing device 902 also includes a hardware identifier generation system 914. Hardware identifier generation system 914 generates application based hardware identifiers for applications of computing device 902, as discussed above. Hardware identifier generation system 914 can implement, for example, hardware identifier generation module 208 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 902. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. Computing device 902 may be configured to implement particular instructions and/or functions corresponding to the software and/or hardware modules. Accordingly, implementation of modules as a module that is executable by computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, computing device 902 may assume a variety of different configurations, such as for computer 916, mobile 918, and television 920 uses. Each of these configurations includes devices that may have generally different constructs and capabilities, and thus computing device 902 may be configured according to one or more of the different device classes. For instance, computing device 902 may be implemented as the computer 916 class of a device that includes a personal computer, desktop computer, a multi-screen computer, laptop computer, netbook, and so on.

Computing device 902 may also be implemented as the mobile 918 class of device that includes mobile devices, such as a mobile phone, portable music player, portable gaming device, a tablet computer, a multi-screen computer, and so on. Computing device 902 may also be implemented as the television 920 class of device that includes devices having or connected to generally larger screens in casual viewing environments. These devices include televisions, set-top boxes, gaming consoles, and so on.

The techniques described herein may be supported by these various configurations of computing device 902 and are not limited to the specific examples of the techniques described herein. This functionality may also be implemented all or in part through use of a distributed system, such as over a "cloud" 922 via a platform 924 as described below.

Cloud 922 includes and/or is representative of a platform 924 for resources 926. Platform 924 abstracts underlying functionality of hardware (e.g., servers) and software resources of cloud 922. Resources 926 may include applications and/or data that can be utilized while computer processing is executed on servers that are remote from computing device 902. Resources 926 can also include services provided over the Internet and/or through a subscriber network, such as a cellular or Wi-Fi network.

Platform 924 may abstract resources and functions to connect computing device 902 with other computing devices. Platform 924 may also serve to abstract scaling of resources to provide a corresponding level of scale to encountered demand for resources 926 that are implemented via platform 924. Accordingly, in an interconnected device embodiment, implementation of functionality described herein may be distributed throughout system 900. For example, the functionality may be implemented in part on computing device 902 as well as via platform 924 that abstracts the functionality of cloud 922.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device for maintaining privacy by preventing tracking of a device across different applications, the device comprising:
   one or more processors; and
   one or more computer-readable storage media having stored thereon multiple instructions that, when executed by the one or more processors, cause the one or more processors to:
   obtain application information for an application on the device, the application associated with a service provider that provides content or other functionality to the device, the application information comprising an identifier of the application on the device;
   obtain device information including information for one or more hardware components of the device;
   generate, by a trusted module of the device, an identifier of the device by combining the device information and the application information comprising the identifier of the application on the device, such that the service provider is not able to determine, from the identifier of the device, the device information, the trusted module trusted by the service provider; and
   communicate the identifier of the device to the application, wherein the application is configured to subsequently transmit the identifier to the service provider to obtain the content.

2. A device as recited in claim 1, the instructions causing the one or more processors to generate the identifier comprising instructions causing the one or more processors to generate the identifier of the device based on the device information, the application information, and an identifier of a user of the device.

3. A device as recited in claim 1, the instructions causing the one or more processors to generate the identifier comprising instructions causing the one or more processors to combine the device information and the application information such that different applications on the device have different generated identifiers.

4. A device as recited in claim 3, the one or more hardware components of the device comprising multiple hardware components, the device information comprising information for each of the multiple hardware components, and the instructions causing the one or more processors to generate the identifier comprising instructions causing the one or more processors to, for each of the multiple hardware components:
   combine the information for the hardware component and the application information; and
   generate a hash value by applying a hash function to the combination of the information and the application information.

5. A device as recited in claim 4, the instructions causing the one or more processors to combine the information for the hardware component and the application information comprising instructions causing the one or more processors to concatenate the information for the hardware component and the application information.

6. A device as recited in claim 4, the instructions causing the one or more processors to generate the identifier further comprising instructions causing the one or more processors to truncate each generated hash value.

7. A device as recited in claim 1, the application information including at least one of a name of a publisher of the application or a name of the application.

8. A device as recited in claim 1, wherein the one or more hardware components comprises at least two hardware components such that the information for each of the at least two hardware components of the device uniquely distinguishes each of the at least two hardware components.

9. A device as recited in claim 1, the instructions causing the one or more processors to communicate the identifier of the device further comprising instructions causing the one or more processors to communicate, with the identifier of the device, a nonce provided by a requester and a digital signature generated by digitally signing both the identifier and the nonce, the nonce being a value for protecting against replay attacks.

10. A device as recited in claim 1, wherein the identifier of the application is assigned by an operating system of the device.

11. A device as recited in claim 1, wherein the identifier of the application comprises a package identifier of a package including or more components or modules for the application, the package identifier allowing the package to be accessed by an operating system of the device but not by at least one other component executing on the device.

12. A method implemented in a service provider for maintaining privacy by preventing tracking of a device across different applications, the method comprising:

communicating with a device to obtain a device identifier of the device, the device identifier having been generated by a trusted module of the device by combining an application identifier of an application running on the device and device information including information for one or more hardware components of the device, the application associated with the service provider, such that the service provider is not able to determine, from the device identifier, the device information, the service provider providing content or other functionality to the device, the trusted module trusted by the service provider; and using, by the service provider, the device identifier to identify the device to provide the content.

13. A method as recited in claim 12, the using comprising using the device identifier to determine whether the device is permitted to access particular content of the service provider, the method further comprising:

checking whether the device identifier matches a previously received device identifier; and determining that the device is permitted to access the particular content if the device identifier matches the previously received device identifier.

14. A method as recited in claim 13, the device identifier including information for multiple hardware components of the device, the checking comprising determining whether parts of the device identifier corresponding to particular ones of the multiple hardware components are the same as corresponding parts of the previously received device identifier.

15. A method as recited in claim 12, the device identifier having been also generated based on a user identifier of a user of the device.

16. A method as recited in claim 12, the device including multiple hardware components, and the device identifier having been generated by, for each of the multiple hardware components, combining the information for the hardware component and the application identifier, and generating a hash value by applying a hash function to the combination of the information for the hardware component and the application identifier.

17. A method as recited in claim 12, the communicating comprising communicating with the application to obtain the device identifier.

18. A method as recited in claim 12, wherein different service providers have different device identifiers for the device based on the combined application identifier and device information.

19. A method implemented on a device for maintaining privacy by preventing tracking of a device across different applications, the method comprising:

receiving, from a service provider, a nonce and a request for a device identifier of the device, the nonce being a value for protecting against replay attacks, the device including multiple components, the service provider providing content or other functionality to an application on the device;

requesting the device identifier from a trusted component of the device, and providing the nonce to the trusted component, the trusted component trusted by the service provider;

receiving both a device identifier and a digital signature from the trusted component, the digital signature having been generated by digitally signing data including the nonce and the device identifier, the device identifier having been generated by, for each of the multiple hardware components, combining the information for the hardware component and application information comprising an identifier of the application on the device, such that the service provider is not able to determine, from the device identifier, the device information, and generating a hash value by applying a hash function to the combination of the information for the hardware component and the application information;

communicating both the device identifier and the digital signature to the service provider to obtain the content.

20. A method as recited in claim 19, the device identifier having been further generated by, for each of the multiple hardware components:

combining the information for the hardware component, the application information, and a user identifier of a user of the device; and generating the hash value by applying the hash function to the combination of the information for the hardware component, the application information, and the user identifier.

* * * * *